United States Patent
Thompson et al.

(10) Patent No.: US 11,530,765 B2
(45) Date of Patent: Dec. 20, 2022

(54) GIMBAL JOINTS FOR BLEED AIR SYSTEMS

(71) Applicant: Senior IP GmbH

(72) Inventors: Christopher Thompson, Newhall, CA (US); Matthew Parker, Redondo Beach, CA (US); Eric Possert, Pacoima, CA (US)

(73) Assignee: SENIOR IP GMBH, Schaffhausen (CH)

( * ) Notice: Subject to any disclaimer, the term of this patent is extended or adjusted under 35 U.S.C. 154(b) by 562 days.

(21) Appl. No.: 16/442,541

(22) Filed: Jun. 16, 2019

(65) Prior Publication Data

US 2020/0393067 A1    Dec. 17, 2020

(51) Int. Cl.
F16L 27/02 (2006.01)
F16L 27/111 (2006.01)
F16L 51/02 (2006.01)

(52) U.S. Cl.
CPC ............ F16L 27/02 (2013.01); F16L 27/111 (2013.01); F16L 51/027 (2013.01)

(58) Field of Classification Search
CPC .......... F16L 27/02; F16L 27/04; F16L 27/111; F16L 51/025; F16L 51/027
See application file for complete search history.

(56) References Cited

U.S. PATENT DOCUMENTS

| | | | |
|---|---|---|---|
| 2,998,270 A * | 8/1961 | Watkins | F16L 59/185 285/227 |
| 3,232,646 A * | 2/1966 | Stark | F16L 27/0857 29/411 |
| 4,480,857 A | 11/1984 | Graves | |
| 4,645,244 A | 2/1987 | Curtis | |
| 4,652,025 A * | 3/1987 | Conroy, Sr. | F16L 27/0857 285/226 |
| 7,040,666 B2 * | 5/2006 | Christianson | F02K 1/805 285/264 |
| 9,163,762 B2 | 10/2015 | French et al. | |

(Continued)

OTHER PUBLICATIONS

European Patent Office, International Search Report and Written Opinion issued in PCT/EP2020/065181, dated Sep. 23, 2020, 10 pgs.

*Primary Examiner* — Zachary T Dragicevich
*Assistant Examiner* — Alexander T Rufrano
(74) *Attorney, Agent, or Firm* — Greenberg Traurig, LLP

(57) ABSTRACT

A sealed joint assembly for transmitting high temperature and high pressure fluid between adjoining ducts in, for example, an aircraft bleed air system, includes a gimbal ring and two annular clevises. Each clevis includes a pair of axially-extending lobes that each includes a bore hole extending therethrough. The bore holes of the clevis lobes may each align with a respective bore hole formed within the gimbal ring, through which a pin may be inserted to couple the clevises to the gimbal ring. The clevises and gimbal ring may be formed using additive manufacturing, to produce component geometries and topologies that reduce the overall weight of the joint assembly while maintaining or improving its structural integrity. For example, the clevis lobes may include a plurality of gaps, such that the remaining material forms a shear web. The gimbal ring may also include strut or truss networks to enhance structural integrity.

18 Claims, 17 Drawing Sheets

(56) References Cited

U.S. PATENT DOCUMENTS

| | | |
|---|---|---|
| 10,428,986 B2 * | 10/2019 | Yeandel ................ F16L 27/11 |
| 11,085,565 B2 * | 8/2021 | Tajiri ..................... F16L 27/02 |
| 11,112,040 B2 * | 9/2021 | Sparks ................... F16L 27/06 |
| 2016/0312923 A1 | 10/2016 | Shi |
| 2018/0038530 A1 | 2/2018 | Yeandel |
| 2018/0202589 A1 | 7/2018 | Tajiri et al. |
| 2018/0202590 A1 * | 7/2018 | Tajiri ................... F16L 27/111 |
| 2019/0086009 A1 | 3/2019 | Thorogood |
| 2021/0180733 A1 * | 6/2021 | Gupta ................... B33Y 80/00 |
| 2021/0190246 A1 * | 6/2021 | Corll ................... F16L 27/0857 |

* cited by examiner

GIMBAL JOINTS FOR BLEED AIR SYSTEMS

FIELD OF THE INVENTION

The present invention generally relates to gimbal joints for ducting, and more specifically to sealed gimbal joint assemblies for flexibly connecting ducts that transmit high temperature and high pressure fluids, such as bleed air ducting systems in aircraft or spacecraft, and more particularly to reduced-weight gimbal joint designs that maintain sufficient structural integrity and provide suitable flexibility for high performance aerospace applications.

BACKGROUND OF THE INVENTION

Ducting systems are commonly used to convey high pressure, high temperature fluids across sections of a system. Ducting systems are typically constructed from a series of conduits that are fluidly coupled to each other by way of sealed joints, such as within an aircraft or a spacecraft. Depending on the particular system, the sealed joints may provide for some amount of angular, axial, and/or lateral flexibility, to enable the joints to turn and/or to withstand vibration, turbulence, stresses, as well as significant fluctuations in temperature and pressure.

Combustion turbine engines operate by compressing air through one or more compressor stages, some or all of which is mixed with gas and ignited at a combustor stage. Certain turbine engines—such as turbofans engines, jet engines, and rocket engines, among others—may compress more air than is necessary for combustion. Some of this excess compressed air may be conveyed through a bleed air duct system of an aircraft or spacecraft for non-thrust purposes, such as pressurizing and/or heating a cabin, engine and airframe anti-icing, and driving pneumatic actuators, among other possible uses.

Typically, compressed air in bleed air duct systems exits the compressor stage of a turbine engine at temperatures as high as 1300° Fahrenheit, and at pressures as high as 1,000 PSIG, although the temperatures and pressures vary during operation. Fluctuations in temperature and pressure can produce stresses in the bleed air ducts, which if left unmitigated can damage the ducting. It is therefore desirable to provide sealed ducting joints that permit some degree of expansion, rotation, translation and/or angling to accommodate the stresses caused by fluctuations in temperature and pressure, as well as by the stresses, forces, vibrations and turbulence of flight itself. In addition, bleed air ducting systems are typically fitted into irregularly shaped areas of an aircraft or spacecraft. Thus, it is also desirable to provide flexible joints capable of angling ducts relative to each other to fit within a particular confined space.

One known flexible joint assembly for bleed air systems is a ball joint, which includes a pair of complementary spherical shells to enable one duct to be angled relative to its adjoining duct. A bellows may be sealed to both ends of the ball joint to provide a fluid-tight gas passage extending through the center of the ball joint. While ball joints can enable high levels of angular deflection, they require a substantial amount of material in order to provide a sufficient amount of structural integrity, together with a substantial amount of friction and resistance.

Gimbal joints have also been used in bleed air systems to provide adequate flexibility between adjoining ducts. Gimbal joints are typically limited to rotation in one or two degrees of freedom, with the axes of rotation extending through clevis lugs that form a revolute joint, together with a central gimbal ring. A common gimbal joint assembly includes a pair of clevises that are rigidly coupled to a gimbal ring with four with pins or lugs extending through aligned holes in the clevises and gimbal ring, at 90° intervals.

Existing gimbal joint designs may provide for levels of flexibility and strength that meet or exceed a particular set of requirements. However, existing gimbal joints are not typically "optimized"—to minimize weight and/or the amount of metal used to construct the components.

Accordingly, there is an opportunity to reduce the weight of an aircraft or spacecraft by optimizing the geometry and/or topology of the gimbal joints used in its bleed air ducting system. It is therefore an object of the present invention to provide reduced-weight gimbal joint assemblies that maintain sufficient structural integrity for high temperature and high pressure applications.

These and other objectives and advantages of the present invention will become apparent from the following detailed written description, drawing figures, and claims.

SUMMARY OF THE INVENTION

To accomplish the aforementioned objectives, embodiments of the present invention provide for gimbal joint assemblies that improve upon existing gimbal joints by removing or omitting extraneous material from the gimbal joint assembly in a manner that substantially maintains compliance with one or more structural requirements. Unlike traditional gimbal joint components, which are constructed from substantially solid annular components, gimbal joints fabricated according to the present disclosure possess more complex topologies that omit structurally-dispensable material. In some embodiments, the particular dimensions of a gimbal joint may be geometrically-optimized and/or topologically-optimized, given a set of requirements and constraints, to generate components that minimize or reduce the weight of the gimbal joint assembly, while simultaneously reducing friction (and wear) between rotating or translational contact points. An optimization algorithm may optimize the material layout for a gimbal joint component within a given space to withstand a particular range of loads (e.g., temperatures, pressures, bend angles, etc.), and to factor in any boundary conditions and other constraints (e.g., limitations of a particular manufacturing method, such as the resolution of an additive manufacturing machine) that may affect the efficient design and enhanced operation of the gimbal joint. Aspects of these engineering requirements and design constraints may be parameterized, and used to generate, optimize, or otherwise refine the geometry and/or topology of one or more gimbal joint components.

An example gimbal joint assembly includes two opposing annular clevises, a central gimbal ring positioned between the clevises, and a bellows extending between the clevises. Each clevis includes a shroud for adjoining the clevis to a respective pipe or duct, along with a pair of lobes that extend over and above a portion of the central gimbal ring, at successively alternating 90° locations. The gimbal ring may include, among other features, struts or trusses that form a "shear web" circumferentially extending about the gimbal ring. The shear web may serve to impart flexibility to the gimbal ring in a manner that maintains an adequate resistance to shear forces. The gimbal ring may include a set of bore holes that are circumferentially spaced about the circumference of the ring that each align with a respective bore hole of a clevis lobe. Pins are positioned through the aligned bore holes to couple the clevises to the gimbal ring.

In an example implementation, the lobes on each clevis are positioned approximately 180° apart from each other, and the bore holes on the gimbal ring are spaced apart by approximately 90° from each other. In this arrangement, the connection between each clevis and the gimbal ring forms a revolute joint, permitting some amount of angular deflection about an axis extending through the pair of clevis lobe bore holes. The clevises may be rotated by about 90° with respect to each other, such that the axis of rotation for one clevis is orthogonal to the axis of rotation of the other clevis. In this manner, the gimbal joint may permit angular deflection between two adjoining ducts in two degrees of freedom.

In some embodiments, components of the gimbal joint assembly may be manufactured using additive manufacturing processes, such as direct metal laser sintering (DMLS). Some additive manufacturing techniques are capable of producing intricate and precise designs that would be difficult or impossible to produce using other manufacturing techniques. Embodiments of the present disclosure leverage the improved precision afforded by additive manufacturing to produce designs that are robust, and which may use fewer components compared to traditional gimbal joints by integrating multiple features into a single element. For instance, some implementations of the present disclosure include clevises that include an axially- and circumferentially-extending narrow slot adjacent to their proximal ends (the axial ends of the clevises that face each other when assembled). Each slot is adapted to receive an end of a bellows, which may be welded, brazed, or otherwise sealedly joined to the clevis. While previous gimbal joint designs have sandwiched bellows ends between two or more separate components, some embodiments of the present disclosure integrate bellows slots into the clevis itself, thereby reducing the number of steps to assemble the gimbal joint.

Other aspects of a gimbal joint's structure and design may be varied to account for space constraints, material properties and, anticipated mechanical and/or thermal stresses, among other possible factors. For instance, a particular additive manufacturing process may have one or more limitations (e.g., finite resolution, types of shapes or curves that can be produced, etc.) when working with a particular type of material (e.g., titanium). A variety of factors may be considered and/or serve as parameters that constrain, inform, or otherwise affect the geometry and/or topology of a particular gimbal joint design.

While various example gimbal joint designs are described above, and in greater detail below, and are shown in the drawings, it should be understood that the particular dimensions, shapes, and features used in a specific implementation may depend on the design constraints and engineering requirements of that specific implementation. The specific examples shown and described herein are provided for explanatory purposes. Different geometries and topologies not explicitly shown and described herein may nonetheless be used to achieve the objectives of the present disclosure, based on optimization techniques described herein. The present application is not limited to the explicitly provided examples.

According to a first aspect of the present invention, there is provided a sealed joint assembly for transmitting high temperature and high pressure fluid between adjoining ducts. The joint assembly includes a gimbal ring comprising at least one pair of overlapping struts extending circumferentially around a portion of the gimbal ring, along with a set of bores circumferentially spaced about the gimbal ring. The joint assembly also includes a first clevis having an annular shroud adapted for positioning concentrically within a portion of the gimbal ring, and at least two lobes integrally formed with the shroud. Each lobe extends radially outward and axially over a portion of the gimbal ring. In addition, each lobe has a bore extending therethrough for alignment with a respective bore of the gimbal ring. The first clevis is adapted to sealedly couple with a duct conveying high temperature and high pressure fluid, such as a duct of a bleed air system. The joint assembly also includes a second clevis having an annular shroud adapted for positioning concentrically within a portion of the gimbal ring, and at least two lobes integrally formed with the shroud. Each lobe extends radially outward and axially over a portion of the gimbal ring, and each has a bore extending therethrough for alignment with a respective bore of the gimbal ring. The second clevis adapted to sealedly couple with a duct conveying high temperature and high pressure fluid, such as a duct of a bleed air system. The joint assembly may also include a bellows having a first end and a second end, with the first end being sealedly coupled to the first clevis and the second end being sealedly coupled to the second clevis.

In embodiments according to the first aspect, at least one lobe of said first clevis includes one or more apertures that form a shear web.

In embodiments according to the first aspect, the bellows further includes a plurality of convolutions positioned between said first and second ends.

In embodiments according to the first aspect, the gimbal ring has a first end and a second end axially opposite to the first end. The gimbal ring also includes a first region and a second region between which the pair of overlapping struts circumferentially extends. The pair of overlapping struts includes a first strut and a second strut. The first strut extends from the second side of the first region to the first side of the second region, and the second strut extends from the first side of the second region to the second side of the first region. The first and second struts are not connected at the location where the first and second struts overlap. In these embodiments, the first strut may be integrally formed with the first region and the second region, and the second strut may be integrally formed with the first region and the second region.

In embodiments according to the first aspect, the joint assembly also includes a first pair of at least two pins, with each pin extending through a bore of the gimbal ring and a respective bore of the first clevis. Likewise, the joint assembly according to these embodiments further includes a second pair of at least two pins, with each pin extending through a bore of the gimbal ring and a respective bore of the second clevis.

In embodiments according to the first aspect, the gimbal ring, the first clevis, and/or the second clevis is constructed using one or more additive manufacturing processes.

In embodiments according to the first aspect, the gimbal ring, the first clevis, and/or the second clevis has an optimized geometry that is computationally generated, optimized, or refined based on one or more dimensional constraints.

In embodiments according to the first aspect, the gimbal ring, the first clevis, and/or the second clevis has an optimized topology that may be generated, optimized, or refined based on one or more load specifications, either computationally or through engineering judgment.

In embodiments according to the first aspect, the annular shroud of the first clevis includes a distal section and a proximal section integrally formed with the distal section. A portion of the distal section concentrically overlaps a portion of the proximal section to form an axially-extending slot that is adapted to receive the first end of the bellows. The annular shroud of the first clevis may include a plurality of apertures that extend axially between an inner surface of the annular shroud and the axially-extending slot. The apertures may be adapted to convey braze flux to the first end of the bellows that, after brazing, causes the bellows to form a fluid-tight seal with said first clevis.

According to a second aspect of the present invention, there is provided a sealed joint assembly for transmitting high temperature and high pressure fluid between adjoining ducts. The joint assembly includes a gimbal ring having a set of integrally formed underhanging portions that each extend radially inward from an inner surface of the gimbal ring, and extend axially toward an axial center of said gimbal ring. Each underhanging portion defines a pocket region. The gimbal ring also includes a set of bores circumferentially spaced about the gimbal ring. In addition, each underhanging portion includes a bore in substantial alignment with a bore of the set of bores of the gimbal ring. The joint assembly also includes a first clevis having an annular shroud adapted for positioning concentrically within a portion of the gimbal ring, and at least two lobes integrally formed with the shroud. Each lobe extends radially outward and axially into a respective pocket region of the gimbal ring. Each lobe also includes a bore that substantially aligns with a respective bore of the gimbal ring and with a respective bore of the underhanging portion defining the pocket region into which the lobe is disposed. The joint assembly further includes a second clevis having an annular shroud adapted for positioning concentrically within a portion of the gimbal ring, and at least two lobes integrally formed with the shroud. Each lobe extends radially outward and axially into a respective pocket region of said gimbal ring, and includes a bore that substantially aligns with a respective bore of the gimbal ring and with a respective bore of the underhanging portion defining the pocket region into which the lobe is disposed. Additionally, the joint assembly includes a set of pins, with each pin extending through aligned bores of the gimbal ring, the first clevis, and a respective underhanging portion of the gimbal ring in a double-shear arrangement.

According to a third aspect of the present invention, there is provided a method of manufacturing a sealed gimbal joint for transmitting high temperature and high pressure fluid between adjoining ducts. The method involves forming, by additive manufacturing, a gimbal ring that includes at least one pair of overlapping struts extending circumferentially around a portion of the gimbal ring. The gimbal ring includes a set of bores circumferentially spaced about the gimbal ring. The method also involves forming, by additive manufacturing, a first clevis that includes an annular shroud adapted for positioning concentrically within a portion of the gimbal ring, and at least two lobes integrally formed with the shroud. Each lobe extends radially outward and axially over a portion of the gimbal ring, and has a bore extending therethrough for alignment with a respective bore of the gimbal ring. The method further involves forming, by additive manufacturing, a second clevis that includes an annular shroud adapted for positioning concentrically within a portion of the gimbal ring, and at least two lobes integrally formed with the shroud. Each lobe of the second clevis extends radially outward and axially over a portion of the gimbal ring, and has a bore extending therethrough for alignment with a respective bore of the gimbal ring. Additionally, the method involves sealedly coupling a first end of a bellows to the first clevis and a second end of the bellows to the second clevis.

In embodiments according to the third aspect, the method also involves aligning the bores of the at least two lobes of the first clevis with a first pair of bores of the set of bores of the gimbal ring, and aligning the bores of the at least two lobes of the second clevis with a second pair of bores of the set of bores of the gimbal ring. The method may further involve inserting a set of pins through each respective aligned pair of bore holes, to rigidly couple the first and second clevises to the gimbal ring.

In embodiments according to the third aspect, the method also involves forming, in the annular shroud of the first clevis, a plurality of circumferentially-spaced apertures that each extend axially between an inner surface of the annular shroud and the axially-extending slot. The method may further involve providing braze flux through one or more of the plurality of circumferentially-spaced apertures and proximate to the first end of said bellows. Additionally, the method may involve brazing the first end of said bellows to the first clevis.

According to a fourth aspect of the present invention, there is provided a sealed joint assembly for transmitting high temperature and high pressure fluid between adjoining ducts. The joint assembly includes a gimbal ring, a first clevis, a second clevis, and a bellows. The first clevis includes an annular shroud adapted for positioning concentrically within a portion of the gimbal ring, and at least two lobes integrally formed with the shroud. Each lobe of the first clevis extends radially outward and axially over a portion of the gimbal ring, and includes one or more gaps extending therethrough to produce a shear web of interconnected trusses extending across the lobe. Similarly, the second clevis includes an annular shroud adapted for positioning concentrically within a portion of the gimbal ring, and at least two lobes integrally formed with the shroud. Each lobe of the second clevis extends radially outward and axially over a portion of the gimbal ring, and includes one or more gaps extending therethrough to produce a shear web of interconnected trusses extending across the lobe. The bellows has a first end and a second end, with the first end being sealedly coupled to the first clevis, and the second end being sealedly coupled to the second clevis.

The foregoing summary is illustrative only and is not intended to be in any way limiting. In addition to the illustrative aspects, embodiments, and features described above, further aspects, embodiments and features will become apparent by reference to the drawing figures, the following detailed description, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the invention, and to show how the same may be implemented, there will now be described by way of example only, specific embodiments, methods and processes according to the present invention with reference to the accompanying drawings in which.

DETAILED DESCRIPTION OF THE EMBODIMENTS

Figure 1A:
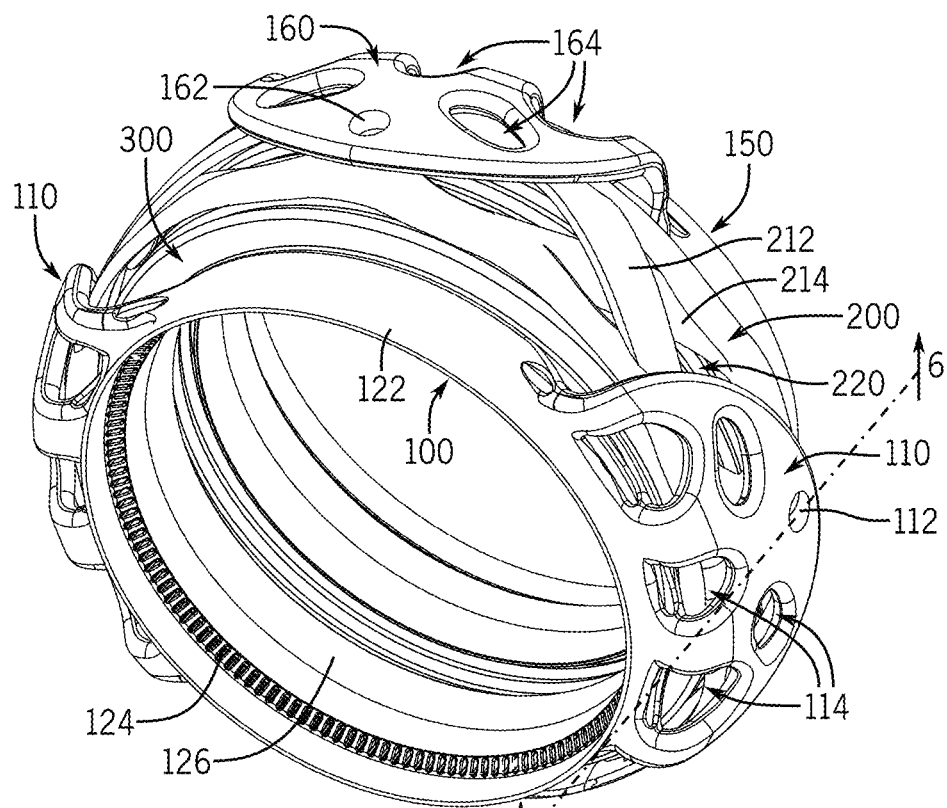
FIG. 1A is a perspective view of an example sealed gimbal joint assembly according to the present invention.

There will now be described by way of example, several specific modes of the invention as contemplated by the inventor. In the following description, numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description of the invention.

As described above, it is an objective of the present invention to provide gimbal joint designs and optimization techniques that balance the strength and structural integrity of the gimbal joint with the overall weight of the gimbal joint assembly. The gimbal joints may be geometrically optimized and/or topologically optimized, such that the gimbal joint assembly satisfies a set of design requirements and anticipated loads, while simultaneously minimizing or reducing the weight of the assembly.

Gimbal joints of the present disclosure include two clevises and a central gimbal ring disposed between the clevises. Each of the clevises and/or the gimbal ring may include topological or structural features—such as spaces, gaps, apertures, struts, trusses, gussets, and/or braces, among other features—that maintains or improves structural integrity with a reduced amount of material, at least compared to solid structures. For example, rather than providing clevises with solid projected lugs or lobes, embodiments of the present disclosure include clevis lobes with one or more gaps or apertures (separate from and in addition to pin holes). The remaining material in the clevis lobes act as an interconnected web of trusses that are capable of handling compressive, tensile, and shear stresses, while reducing the weight of clevis.

Likewise, the central gimbal ring may include one or more structural features integrally formed therein that extend circumferentially about the gimbal ring. For instance, gimbal rings of the present invention may possess integrally formed strut or truss structures that maintain or enhance the gimbal ring's compliance with one or more structural requirements. For example, a gimbal ring may include crisscrossing, overlapping struts capable of bearing compressive and shear loads while also reducing the weight of the gimbal ring. Example gimbal ring constructions are shown and described in more detail below.

As described herein, "optimizing" the shape, geometry, and/or topology of a gimbal joint or its components generally refers to a process by which the geometry and/or the topology of a component is generated, refined, improved, or otherwise modified empirically to better accomplish one or more goals. For example, an initial design for a component may be optimized by analyzing or simulating the strain energy and/or load distribution when the component is subjected to various forces. One goal for the optimization may involve minimizing or reducing the strain energy of the structure to below an acceptable threshold. The optimization, however, may consider one or more constraints and/or boundary conditions that serve as geometric limitations, limitations of a particular manufacturing process, and/or other constraints that must or should be adhered to. Additionally, an optimization may attempt to refine a geometry or topology that minimizes or reduces strain energy, while simultaneously minimizes or reduces the weight of the component. Thus, the term "optimizing" may refer to a process by which a component's design is modified to better accomplish, on balance, one or more goals in view of one or more costs. Further, it should be understood that "optimizing" may not necessarily refer to an absolutely optimal solution or design, and instead may refer to a solution or design that is satisfactory for a particular purpose.

As described herein, "bellows" refers to any type of fluid-tight conduit for conveying gasses or other fluids. Although the term "bellows" sometimes refers to a conduit with a series of convolutions, which impart flexibility and/or expandability to the conduit, the present disclosure may generally refer to "bellows" as encompassing conduits with or without such convolutions, in which sleeves or ducts extend to connect the two opposed ducts to transfer, under seal, the fluids being transferred therebetween.

As described herein, "additive manufacturing" may refer to any manufacturing process or technique for producing three dimensional objects by depositing or fusing material in a series of layers by a computer-controlled fabricator or laser. Some example additive manufacturing techniques include laser powder bed fusion (LPBF), material extrusion, selective laser sintering (SLS), selective laser melting (SLM), among other three-dimensional (3D) printing techniques. Additive manufacturing may involve, for instance, fusing metal powder in layers to construct a 3D component. The present disclosure is not limited to any particular additive manufacturing technique.

As described herein, the "shear web" may refer to a network of trusses, struts, gussets, and/or other reinforcements that are integrally formed with each other to form a structure that has gaps or spaces. Topologically, a shear web may refer to a structure that is a two-dimensional manifold comprised of one or more tori (e.g., a genus-two surface, a genus-three surface, or any other connected sum of one or more tori). A shear web may serve as a suitable replacement for a solid and continuous structure, reducing the weight of a component without compromising the structural integrity of that component.

Various aspects of a gimbal joint—including the sizes, shapes, and arrangement of lobes, struts, trusses, gussets, apertures, and other structural elements—may vary depending upon the particular application and engineering requirements for the gimbal joint. Thus, for example, a gimbal joint design for adjoining ducts conveying low pressure and low temperature gasses may possess different structural features having differing dimensions from those shown and described explicitly herein. The present disclosure encompasses varying aspects of the gimbal joint design to be suitable for different purposes, and the present application is not limited to the gimbal joint designs explicitly shown in the drawings.

Referring to the embodiment of FIGS. 1A-7B, FIG. 1A depicts a perspective view of an example sealed gimbal joint assembly of the present invention. The sealed gimbal joint assembly includes first clevis 100, second clevis 150, gimbal ring 200 disposed between first clevis 100 and second clevis 150, and bellows 300 sealedly coupled to and extending between first clevis 100 and second clevis 150. In the assembled state shown in FIG. 1A, the inner surfaces of first clevis 100, second clevis 150, and bellows 300 form a fluid-tight gas passage adapted for use in high temperature and high pressure environments, such as in bleed air systems for jet engine aircrafts.

First clevis 100 includes a substantially annular shroud formed from distal section 122 and proximal section 126 that is integrally formed with distal section 122. With the sealed gimbal joint assembly in its assembled state, distal section 122 is positioned axially nearer to second clevis 150 and gimbal ring 200 than proximal section 126. In the example according to FIGS. 1A-7B, distal section 122 has a larger radius relative to the radius of proximal section 126, which may permit the distal section 122 to be fitted about an adjoining pipe or duct (see, for example, FIGS. 7A and 7B).

First clevis 100 also includes a pair of lobes 110 that each extend radially outward from the annular shroud and axially over a portion of gimbal ring 200. Each lobe 110 may be integrally formed with the annular shroud of first clevis 100 and extend from distal section 122 and/or proximal section 126. In the example embodiment shown in FIGS. 1A-7B, each lobe 110 extends from the outer surface of distal section 122. Each lobe 110 also includes bore hole 112, which align with a respective bore hole 222 in gimbal ring 200 (see FIG. 4).

Each lobe 110 may include one or more gaps 114, in which a substantial amount of material is omitted during the formation of first clevis 100. In the example shown in FIG. 1A, each lobe 110 includes five substantially-sized gaps 114. Gaps 114 may be omitted material that reduces the overall weight of first clevis 100, while substantially maintaining or improving the structural integrity of first clevis 100. The combination of gaps 114 and material used to form lobe 110 may form a "shear web," such that the interconnected material forms a network of struts, trusses, and/or gussets capable of preventing deformation when subjected to a load, but at a reduced weight—as compared to a solid, non-gapped clevis structure. In some implementations, the size, shape, location, and distribution of gaps 114 may be determined or modified computationally, via geometric optimization and/or topological optimization. Example optimization techniques are described in greater detail below.

In some implementations, first clevis 100 may include a plurality of circumferentially-spaced apertures 124 that axially extend between the inner surface of distal section 122 to the outer surface of proximal end 126. Apertures 124 may be used to convey solder, braze flux, or an adhesive into axially-extending slot 125 (shown in more detail in FIGS. 5 and 6). Axially-extending slot 125 may receive first end 304 of bellows 300, which may be sealedly joined to first clevis 100 by soldering, brazing, welding, adhesion, and/or other joining methods.

Second clevis 150 may be similar to or the same as first clevis 100. Like first clevis 100, second clevis 150 includes a pair of lobes 160 disposed approximately 180° apart from each other. Second clevis 150 may be oriented oppositely to first clevis 100, such that lobes 160 extend axially toward first clevis 100, and lobes 110 extend axially toward second clevis 150. In its assembled state, second clevis 150 is rotated 90° relative to first clevis 100 about their shared central axis, such that each lobe 160 is spaced approximately 90° from adjacent lobes 110. As with lobes 110, each lobe 160 include one or more gaps 164 of omitted dispensable material, and bore hole 162 for receiving a pin, lug, or other connector (not shown in FIGS. 1A-7B).

First clevis 100 and second clevis 150 may be oriented so as to align bore holes 112 and 162 of lobes 110 and 160, respectively, to bore holes 222 formed within gimbal ring 200. Pins, lugs, or other connectors may be placed through aligned bore holes 112, 162, and 222, which may subsequently be welded, brazed, or otherwise held in place to couple first clevis 100 to gimbal ring 200 and second clevis 100 to gimbal ring 200. In this arrangement, first clevis 100 and gimbal ring 200 form a revolute joint that enables first clevis 100 to deflect angularly about an axis that extends through bore holes 112 of first clevis 100. Likewise, second clevis 150 and gimbal ring 200 form a revolute joint that enables second clevis 100 to deflect angularly about a different axis which extends through bore holes 162 of second clevis 150. In this manner, second clevis 150 may be angularly deflected in two degrees of freedom relative to first clevis 100. An example of such angular deflection is illustrated in FIG. 7B.

Figure 2:
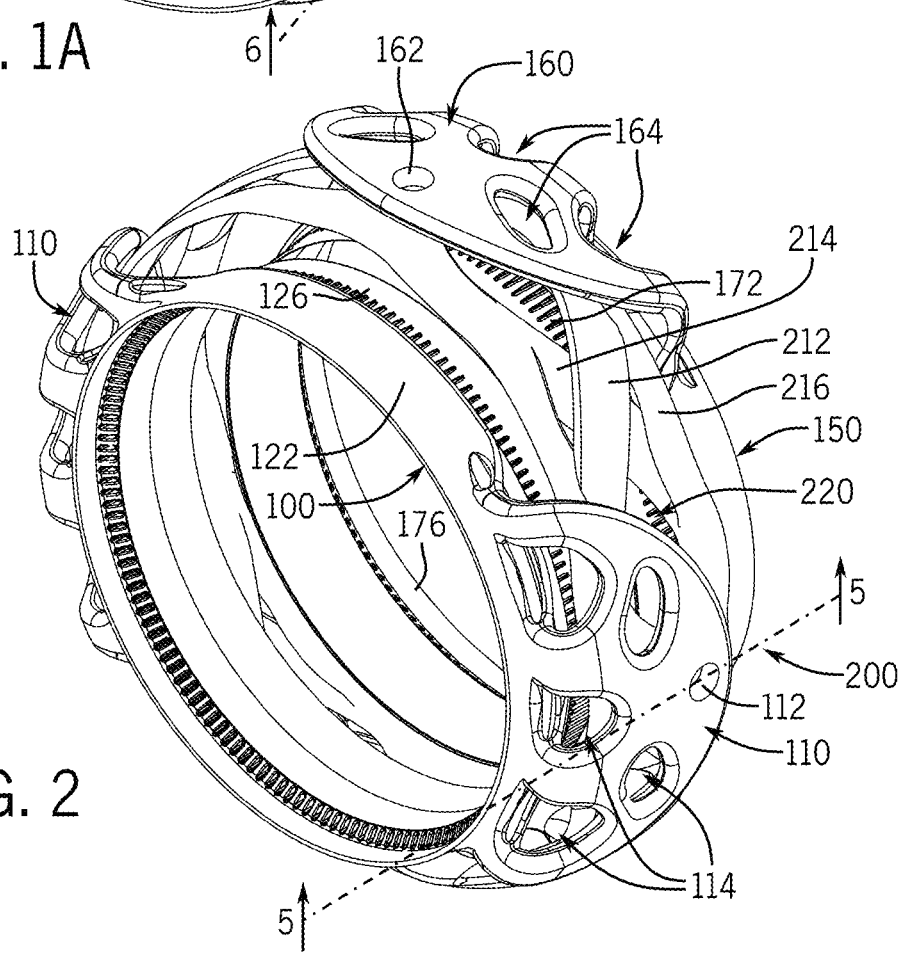
FIG. 2 is a repositioned perspective view of two clevises and a gimbal ring of the example gimbal joint assembly, according to the embodiment of FIG. 1A.
Figure 3:
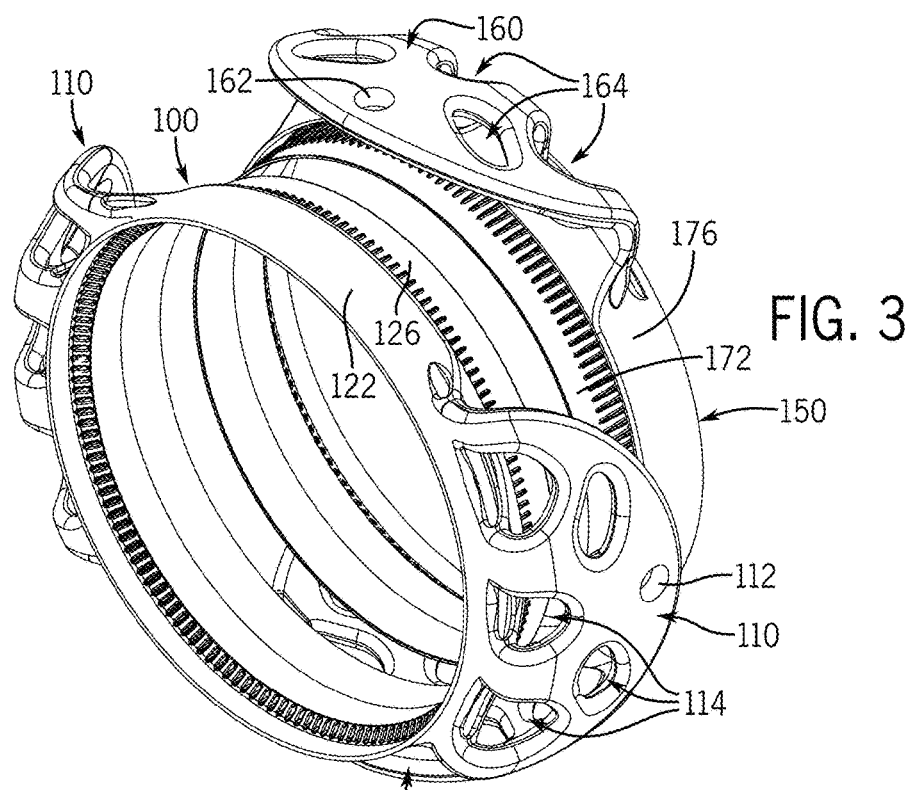
FIG. 3 is a perspective view of the two clevises of the example gimbal joint assembly, according to the embodiment of FIG. 1A.

Second clevis 150, like first clevis 100, also includes distal section 172, proximal section 176, and may include a plurality of circumferentially-spaced apertures 174. The features of second clevis 150 are shown in FIGS. 2 and 3 in more detail, in which FIG. 2 omits bellows 300, and FIG. 3 omits bellows 300 and gimbal ring 200.

Figure 1B:
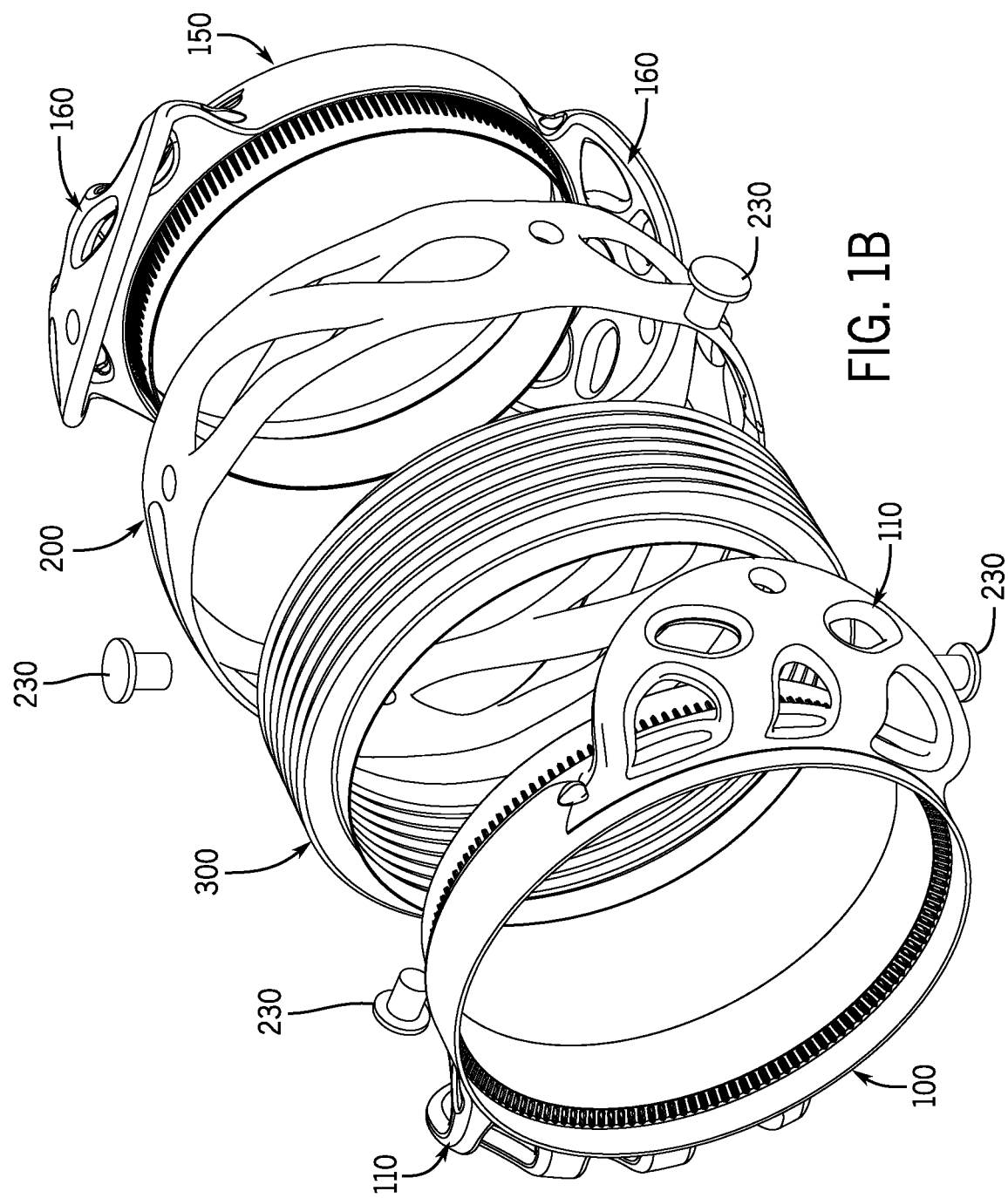
FIG. 1B is an exploded perspective view of the example gimbal joint assembly, according to the embodiment of FIG. 1A.
Figure 6:
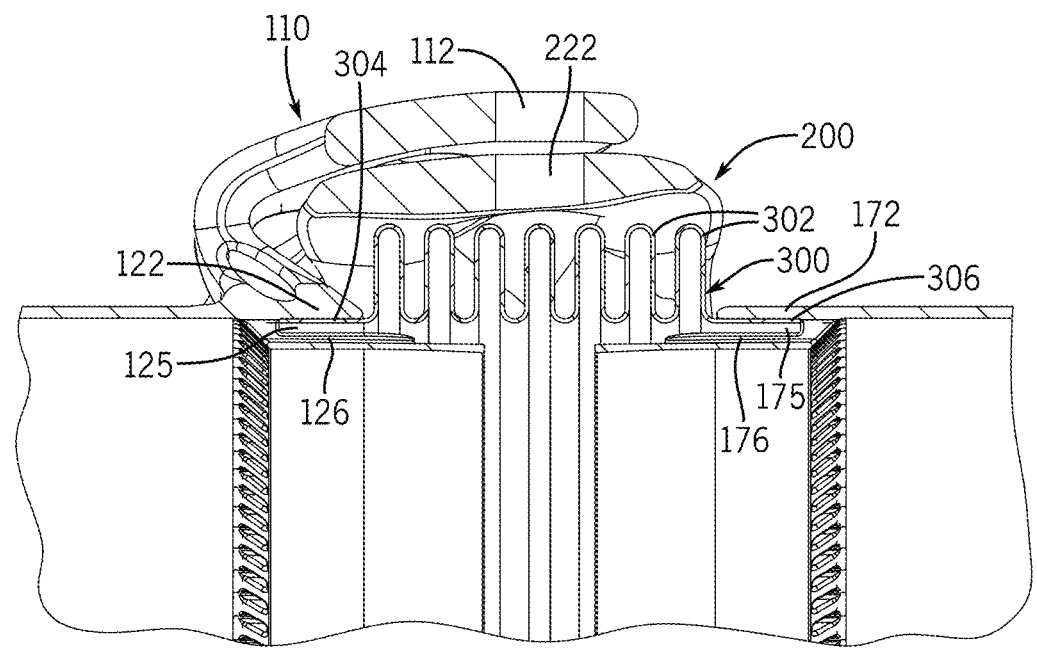
FIG. 6 is an elevated cross-sectional side view of the example gimbal joint assembly, according to the embodiment of FIG. 1A, taken along lines 6-6 and looking in the direction of the arrows.

FIG. 1B depicts the gimbal joint assembly shown in FIG. 1A in an exploded perspective view. As shown in FIG. 1B, bellows 300 (which may include convolutions 302, as shown in FIG. 6) may be concentrically positioned within gimbal ring 200, with clevises 100 and 150 positioned on opposite ends of bellows 300. Pins 230 may be inserted through aligned bore holes 112 and 222 of first clevis 100 and gimbal ring 200, respectively. Likewise, pins 230 may be inserted through aligned bore holes 162 and 222 of first clevis 100 and gimbal ring 200 respectively. Pins 230 may, in some implementations, be welded, brazed, or otherwise secured in place.

Figure 4:
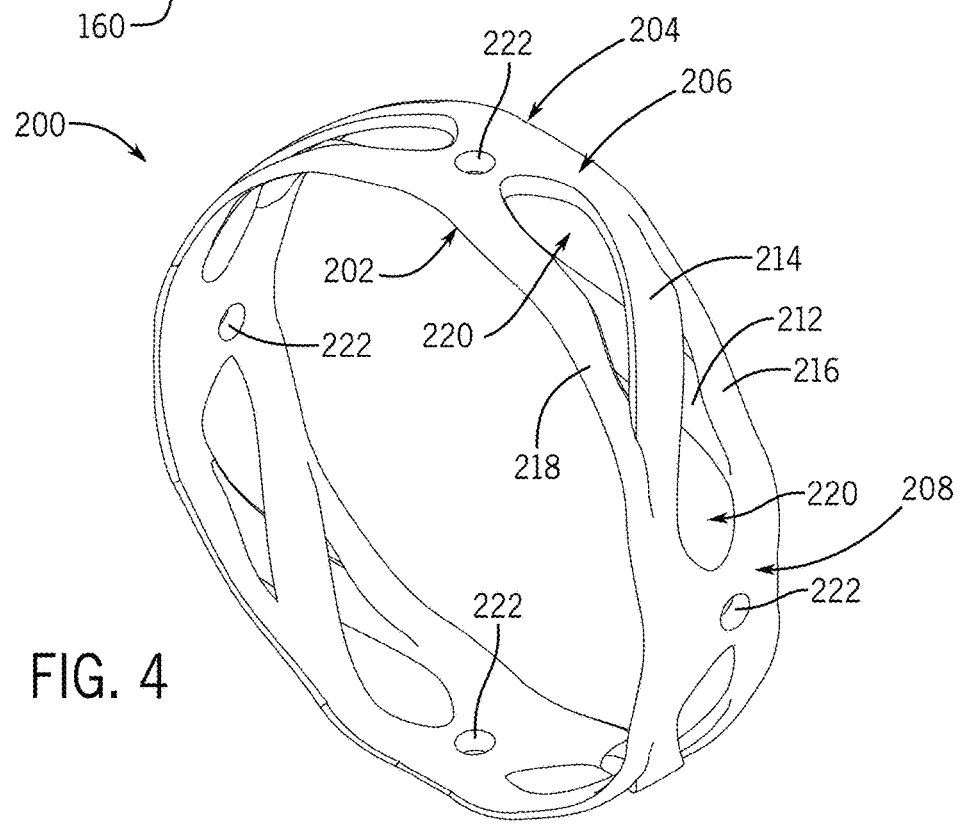
FIG. 4 is a perspective view of the gimbal ring of the example gimbal joint assembly, according to the embodiment of FIG. 1A.

Referring to FIG. 4, gimbal ring 200 is a substantially annular structure that includes struts 212, 214, 216, and 218, gaps 220, and bore holes 222. In the particular implementation shown in FIG. 4, bore holes 222 are circumferentially spaced apart by approximately 90°. Similar to lobes 110 and 160, gimbal ring 200 is nota continuously solid structure, but instead includes gaps 220 where dispensable or extraneous (at least with respect to a particular set of structural requirements) material is omitted.

In this particular example, gimbal ring 200 includes four sets of struts 212, 214, 216, and 218. Strut 212 diagonally extends from first side 202 of gimbal ring 200 at first region 206 to second side 204 of gimbal ring 200 at second region 208. Similarly, strut 214 diagonally extends from second side 204 of gimbal ring 200 at first region 206 to first side 202 of gimbal ring 200 at second region 208. Strut 214 overlaps strut 212, such that strut 214 is the radially outward from strut 212. At the area where struts 212 and 214 overlap, struts 212 and 214 are not connected. This overlapping strut arrangement enables gimbal ring 200 to resist shear forces, while adequately maintaining compliance with other anticipated loads during operation. In addition, the overlapping strut arrangement may possess a geometry that enables struts 212 and 214 to translate relative to each other, but without making direct contact with each other, thereby reducing the amount of wear experienced by gimbal ring 200 over time. Struts 212 and 214 may be integrally formed with first region 206 and second region 208, such that gimbal ring 200 can be formed as a single component.

In some embodiments, gimbal ring 200 also includes side struts 216 and 218, which serve as additional reinforcing structures for gimbal ring 200. Strut 216 extends from second side 204 of first region 206 to second side 204 of second region 208, while strut 218 extends from first side 202 of first region 206 to first side 202 of second region 208. Collectively, struts 212, 214, 216, and 218 may form a truss network that provides comparable or improved structural compliance, but with less material and at a lower weight relative to traditional solid and continuous gimbal rings.

Figure 5:
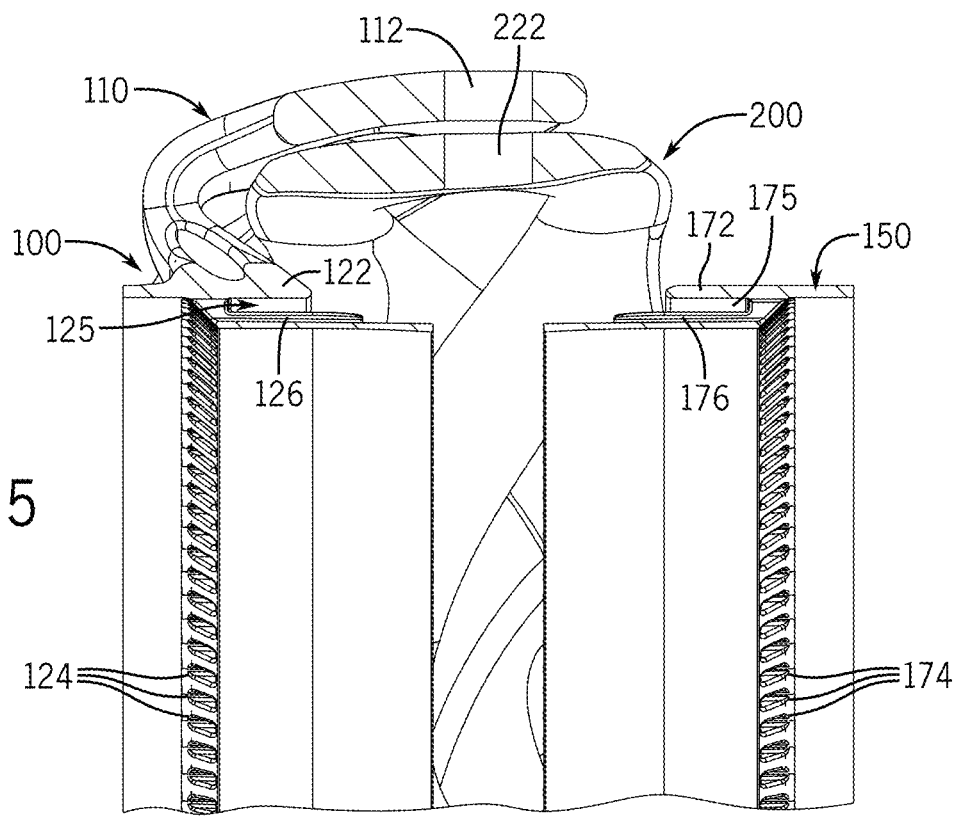
FIG. 5 is an elevated cross-sectional side view of the example gimbal joint assembly, according to the embodiment of FIG. 2, taken along lines 5-5 and looking in the direction of the arrows.

Referring to FIGS. 5 and 6, FIG. 5 illustrates an elevated cross-sectional view of the gimbal joint assembly shown in FIG. 2, taken along lines 5-5. As is shown in FIG. 5, annular distal section 122 of first clevis 100 extends over a portion of annular proximal section 126, forming axially-extending slot 125. Likewise, annular distal section 172 of second clevis 150 extends over a portion of annular proximal section 176, forming axially-extending slot 175. Slots 125 and 175 may be narrow slots adapted to receive ends 304 and 306 of bellows 300, respectively, which is shown in FIG. 6. As described above, apertures 124 and 174 may be used to convey braze flux or an adhesive into slots 125 and 175, respectively, to in turn sealedly joint bellows 300 to first clevis 100 and second clevis 150. However, apertures 127 and 174 are optional features, and other methods for adjoining bellows 300 to first clevis 100 and second clevis 150 may also be used.

FIGS. 5 and 6 also illustrate the alignment of bore hole 112 of first clevis 100 and bore hole 222 of gimbal ring 200. A pin, lug, or other connector may be inserted through the aligned bore holes 112 and 222, thereby coupling first clevis 100 to gimbal ring 200. A similar joining technique may also be used for aligned bore holes 162 and 222 (not shown in FIGS. 5 and 6).

Figure 7A:
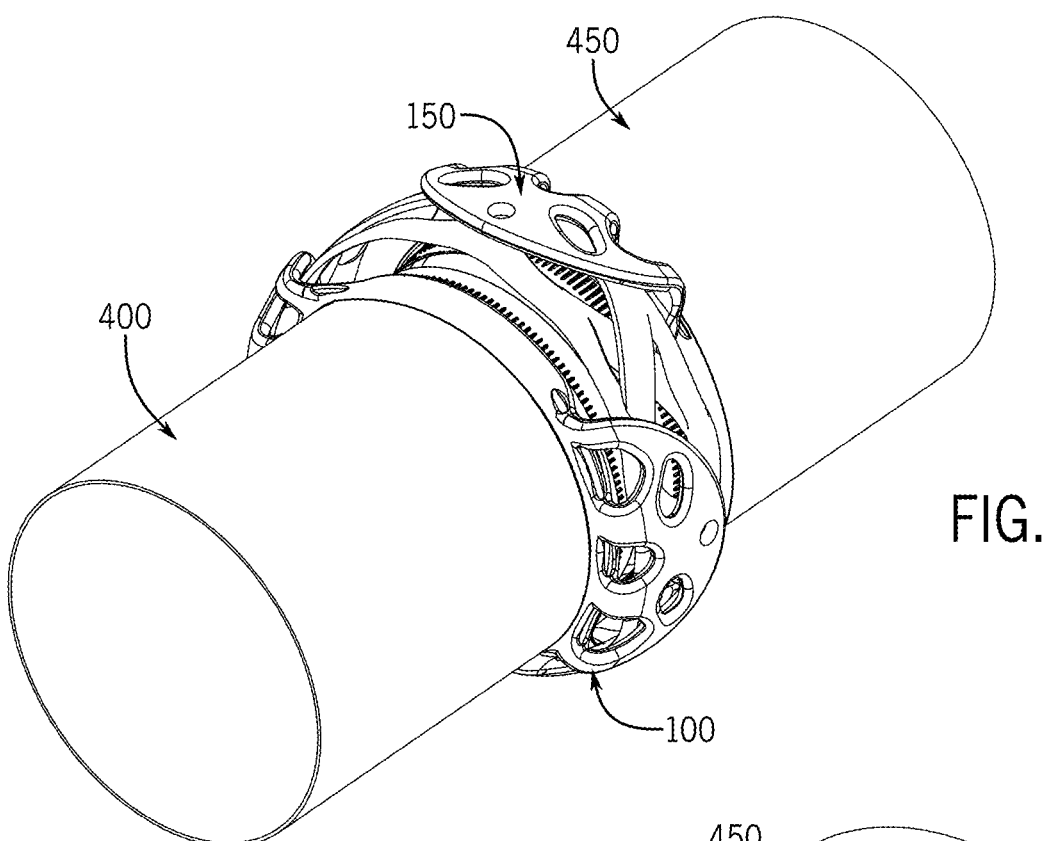
FIG. 7A is a perspective view of an example gimbal joint assembly adjoined with a pair of ducts in an aligned position.
Figure 7B:
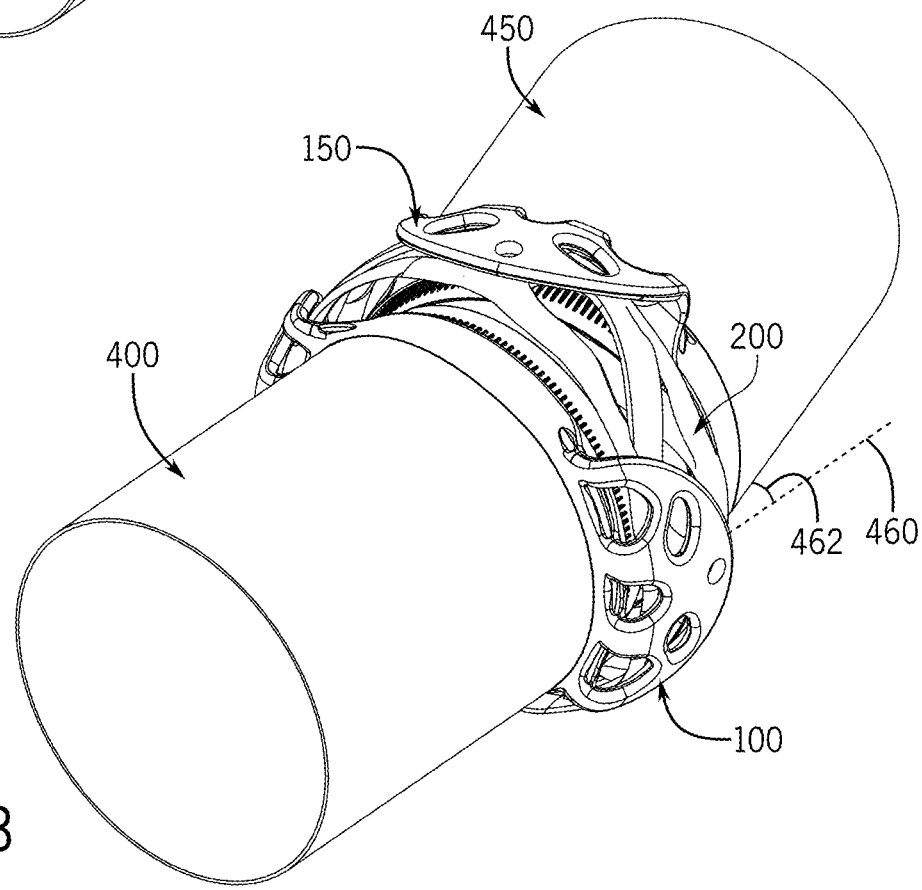
FIG. 7B is a perspective view of an example gimbal joint assembly adjoined with the pair of ducts in an angularly deflected position, relative to the embodiment of FIG. 7A.

FIGS. 7A and 7B illustrate an example application, in which first clevis 100 is coupled to duct 400, and second clevis 150 is coupled to duct 450. FIG. 7A depicts an assembly in which the gimbal joint is not under load, such that ducts 400 and 450 are aligned and have no angular deflection relative to each other. In contrast, FIG. 7B depicts a scenario in which the gimbal joint assembly is under load, causing duct 450 to gimbal at an angle 462 relative to the an axis 460 of duct 400.

As shown in FIG. 7B, the revolute joint formed by lobes 160 of second clevis 150 enables duct 450 to deflect to the left (from the perspective shown in FIG. 7B). Similarly, the revolute joint formed by lobes 110 of first clevis 100 enables duct 450 to deflect upwardly (from the perspective shown in FIG. 7B). Thus, the gimbal joint assembly formed from first clevis 100, second clevis 150, and gimbal ring 200 enables angular deflection in two degrees of freedom.

FIGS. 8-14F depict an alternative embodiment gimbal joint assembly, which may be referred to herein as an "interlocking" or "double-shear" gimbal joint design. Similar to the embodiment shown and described above with respect to FIGS. 1A-7A, the interlocking gimbal joint assembly includes a pair of clevises (first clevis 500 and second clevis 550) positioned within the gimbal ring itself (gimbal ring 600). In addition, first clevis 500 and second clevis 550 include pairs of integrally formed and topologically efficient lobes 510 and 560, respectively, that include bore holes (such as bore hole 512 shown in FIG. 14F) that align with respective bore holes 620 formed in gimbal ring 600. Pins, such as pins 630 or pin 640 shown in FIG. 12, may be inserted through the aligned bore holes to couple gimbal ring 600 to first clevis 500 and second clevis 550.

As mentioned, unlike the embodiment shown and described above with respect to FIGS. 1A-7A, in which gimbal ring 200 was positioned concentrically within lobes 110 and 160, nearly all of first clevis 500 and second clevis 550 are disposed concentrically within gimbal ring 600. In addition, whereas gimbal ring 200 includes overlapping crisscrossing struts 212 and 214, gimbal ring 600 includes a diagonally-extending strut 612 and a pair of axially-extending trusses 614 and 616, which collectively form a shear web to impart structural rigidity to gimbal ring 600.

First clevis 500 and second clevis 550 may possess one or more features of clevises 100 and 150 described above. For example, clevises 500 and 550 may include distal sections 522 and 572, respectively, and proximal ends 524 and 574, respectively. In addition, clevises 500 and 550 may also include axially-extending slots 525 and 575 for receiving ends of a bellows (not shown). Clevises 500 and 550 may include any combination of clevis or lobe features described herein with respect to any of the embodiments of the present disclosure.

Figure 8:
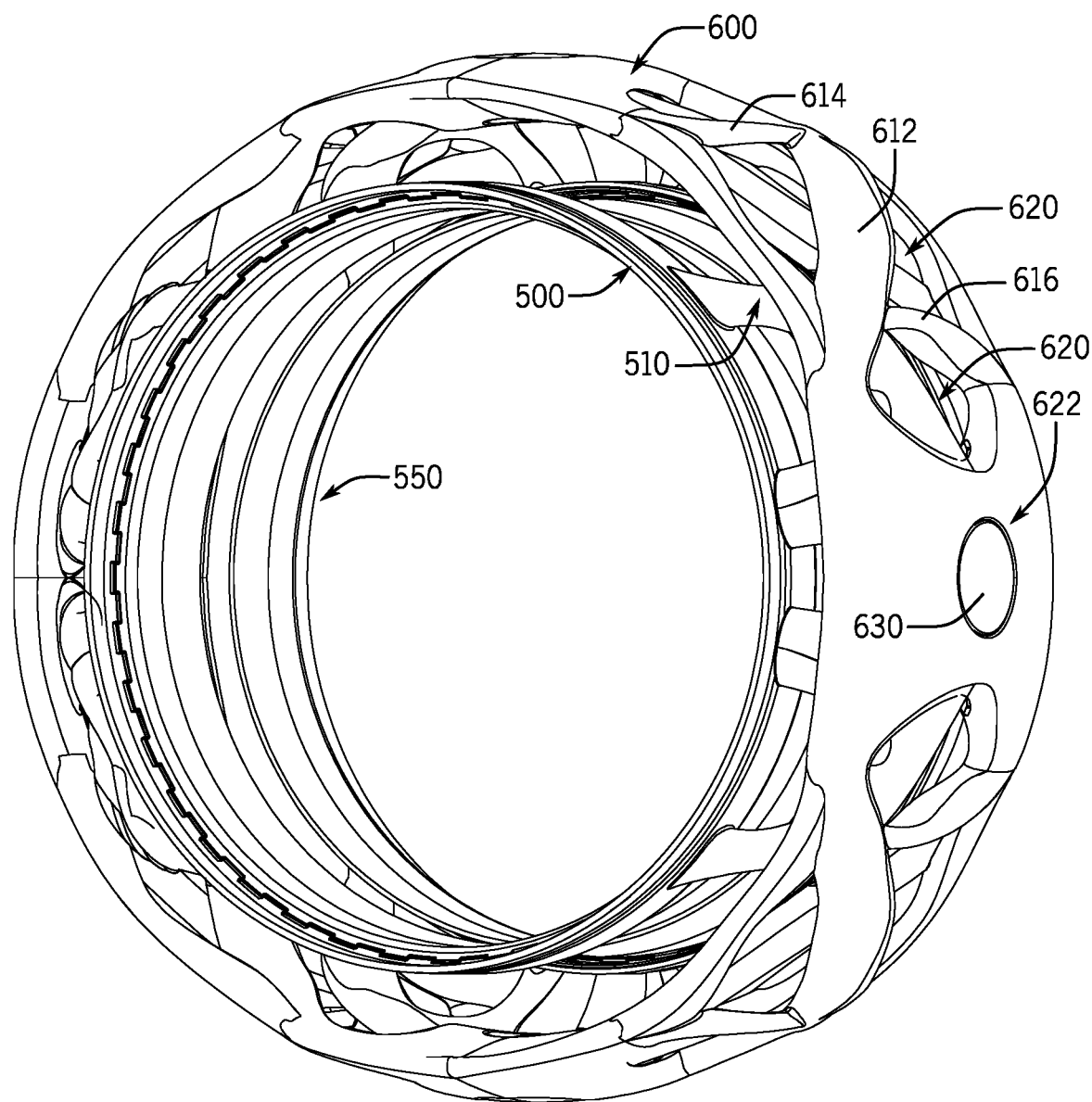
FIG. 8 is a perspective view of another embodiment of the interlocking gimbal joint assembly of the present invention, in which the clevises are positioned within the central gimbal ring, instead of positioned about the gimbal ring, as shown in FIGS. 1A through 7B.
Figure 9:
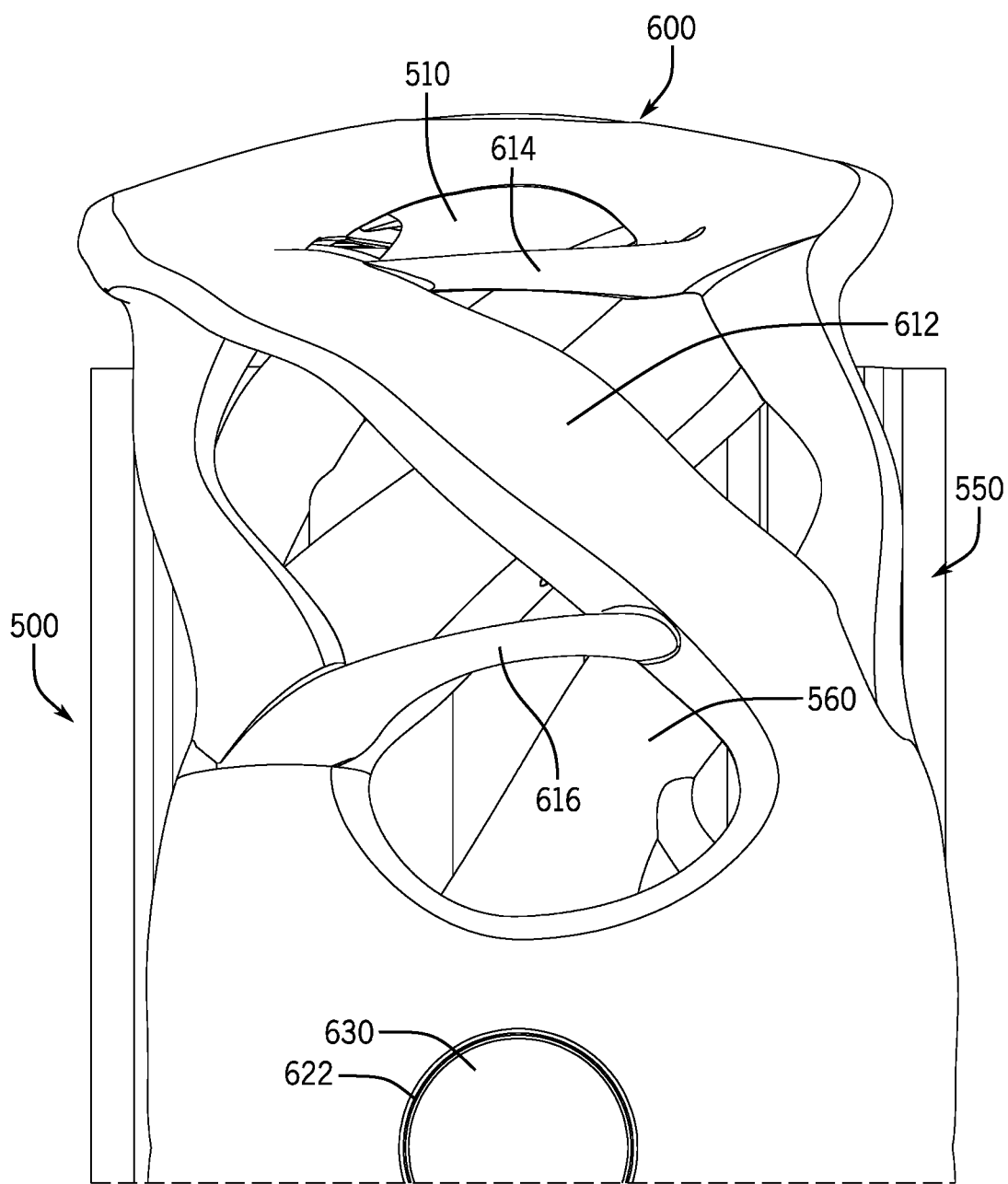
FIG. 9 is a detailed, elevated side view of the example interlocking gimbal joint assembly, according to the embodiment of FIG. 8.
Figure 11:
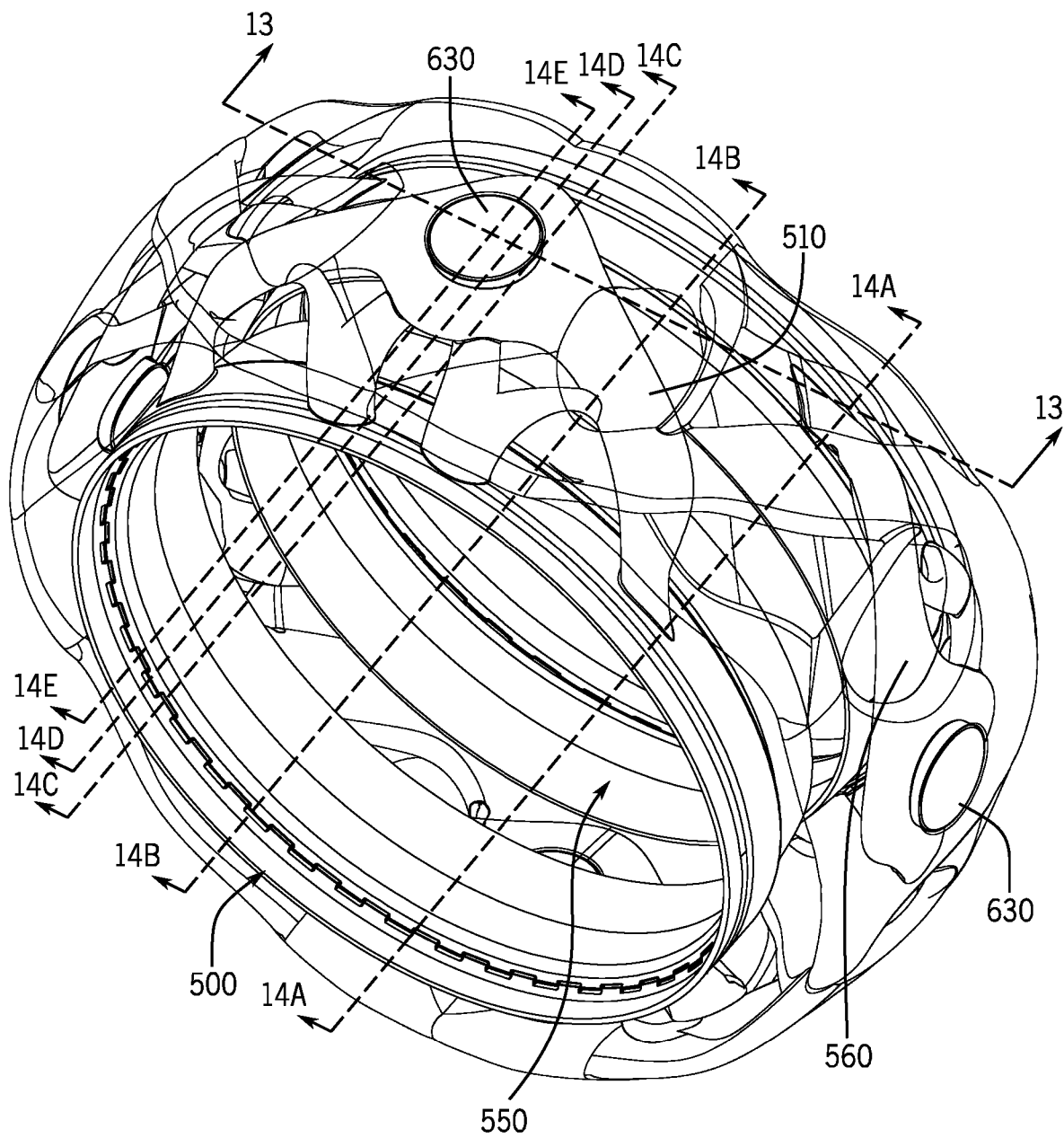
FIG. 11 is a perspective phantom view of the example interlocking gimbal joint assembly, with a substantially transparent gimbal ring shown for explanatory purposes, according to the embodiment of FIG. 8.

FIG. 11 illustrates the example interlocking gimbal joint assembly according to the embodiment of FIG. 8, but with gimbal ring 600 shown as being translucent. The translucency of gimbal ring 600 is provided for explanatory purposes, and does not necessarily indicate the types of materials that can be used in forming gimbal ring 600. As shown in FIG. 11, lobe 510 extends from the outer surface of the annular portion of first clevis 500, both axially and radially. The shape of lobe 510 is similar to that of a hook or anchor. Around pin 630, gimbal ring 600 includes a C-shaped underhanging "mouth" portion that extends radially beneath lobe 510, forming a pocket into which a portion of lobe 510 is positioned. The "pocket" structure of gimbal ring 600 is shown in more detail in the cross-sectional views of FIGS. 13 and 14A-14F.

Figure 14A:
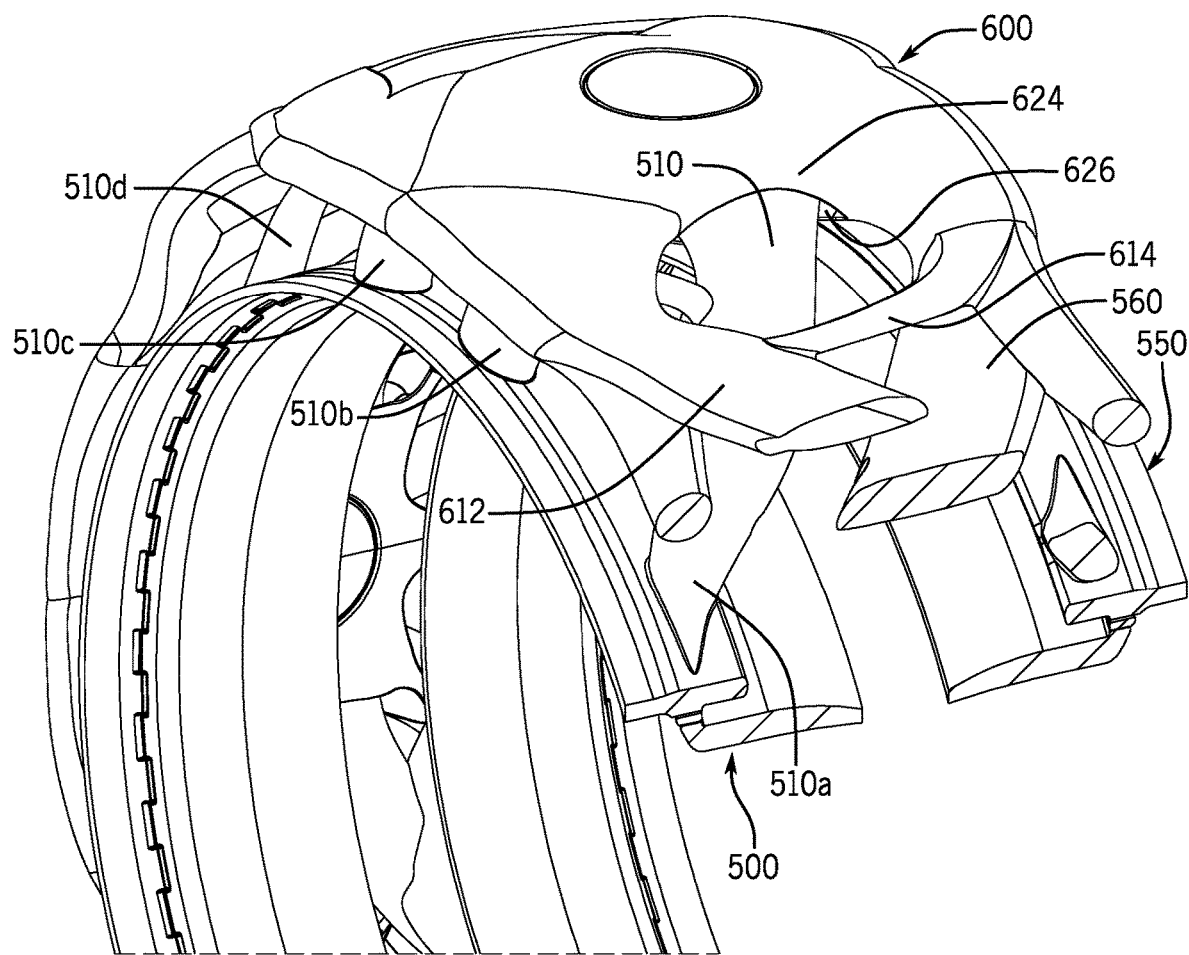
FIG. 14A is a cross-sectional perspective view of the example interlocking gimbal joint assembly, according to the embodiment of FIG. 11, taken along lines A-A and looking in the direction of the arrows.
Figure 14B:
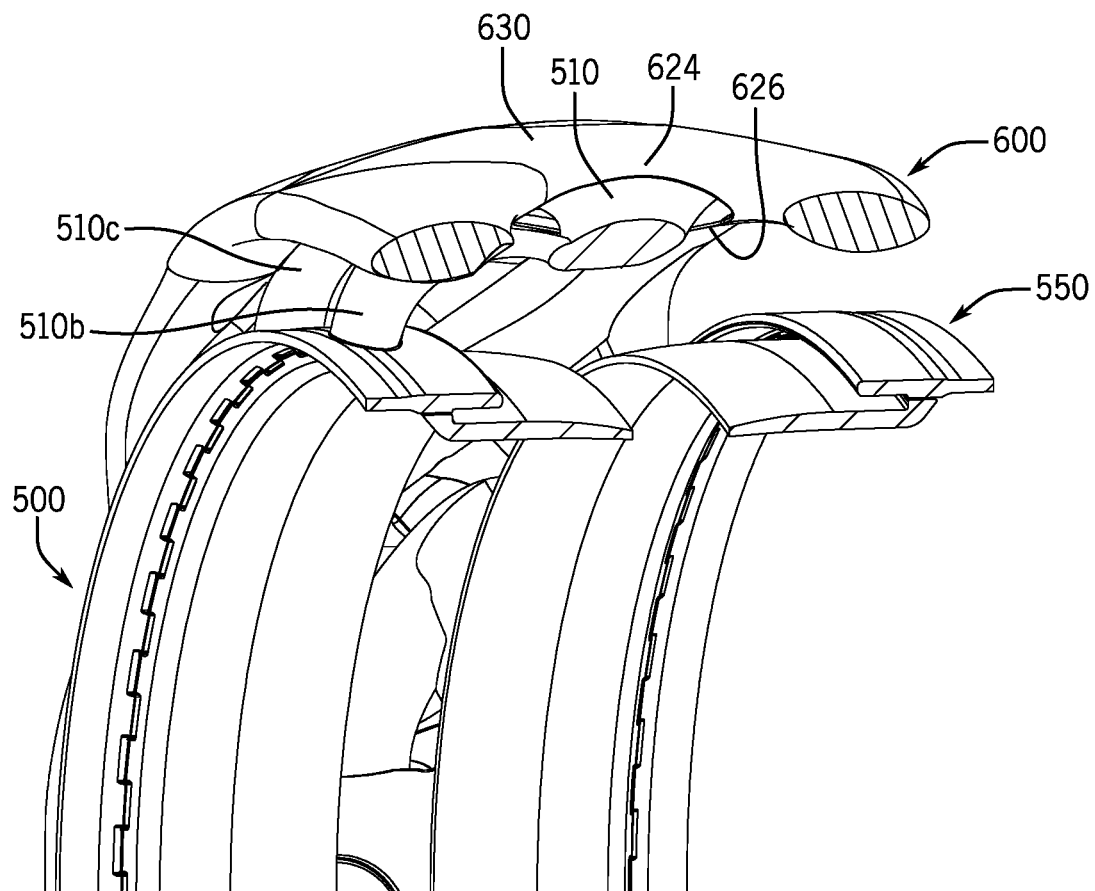
FIG. 14B is a cross-sectional perspective view of the example interlocking gimbal joint assembly, according to the embodiment of FIG. 11, taken along lines B-B and looking in the direction of the arrows
Figure 14C:
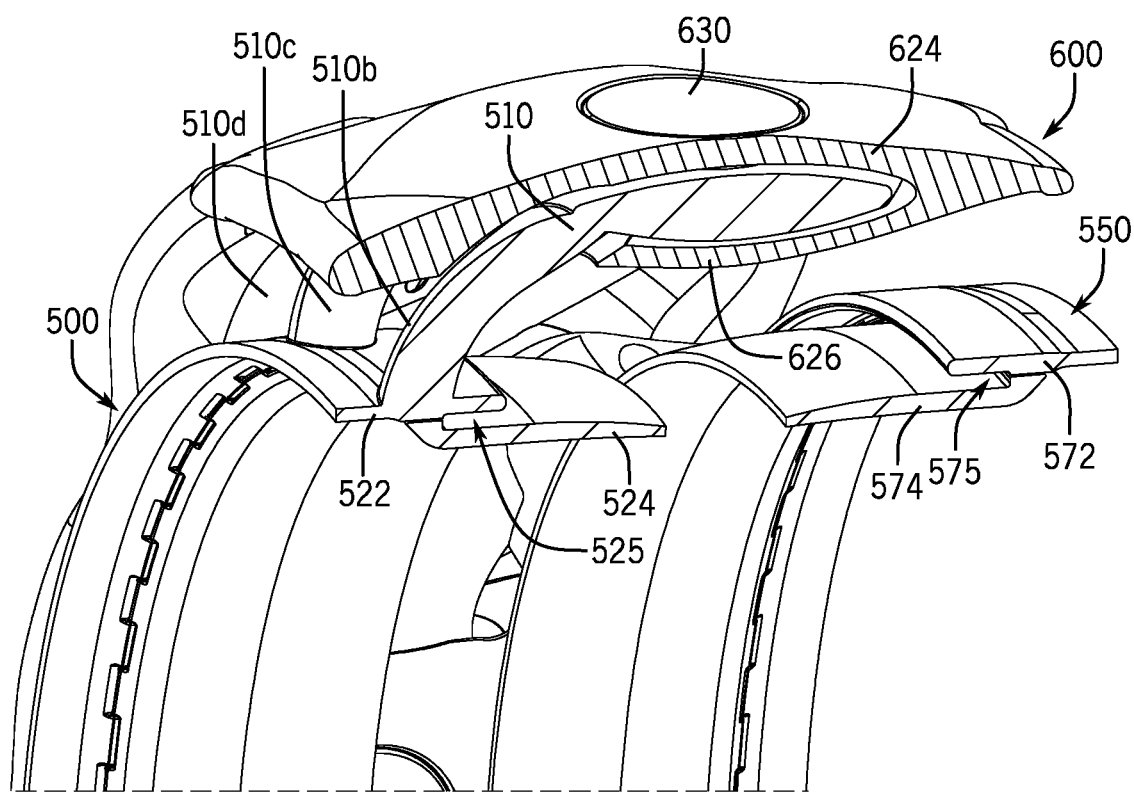
FIG. 14C is a cross-sectional perspective view of the example interlocking gimbal joint assembly, according to the embodiment of FIG. 11, taken along lines C-C and looking in the direction of the arrows.
Figure 14D:
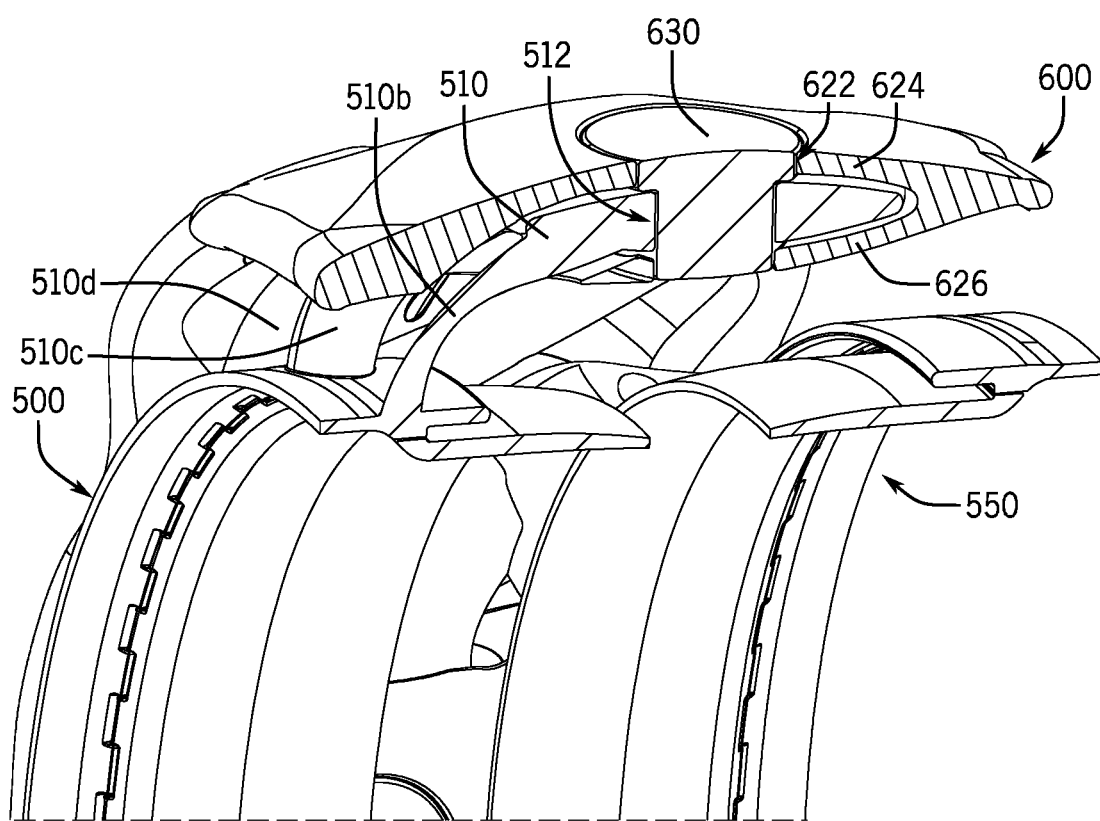
FIG. 14D is a cross-sectional perspective view of the example interlocking gimbal joint assembly, according to the embodiment of FIG. 11, taken along lines D-D and looking in the direction of the arrows.
Figure 14E:
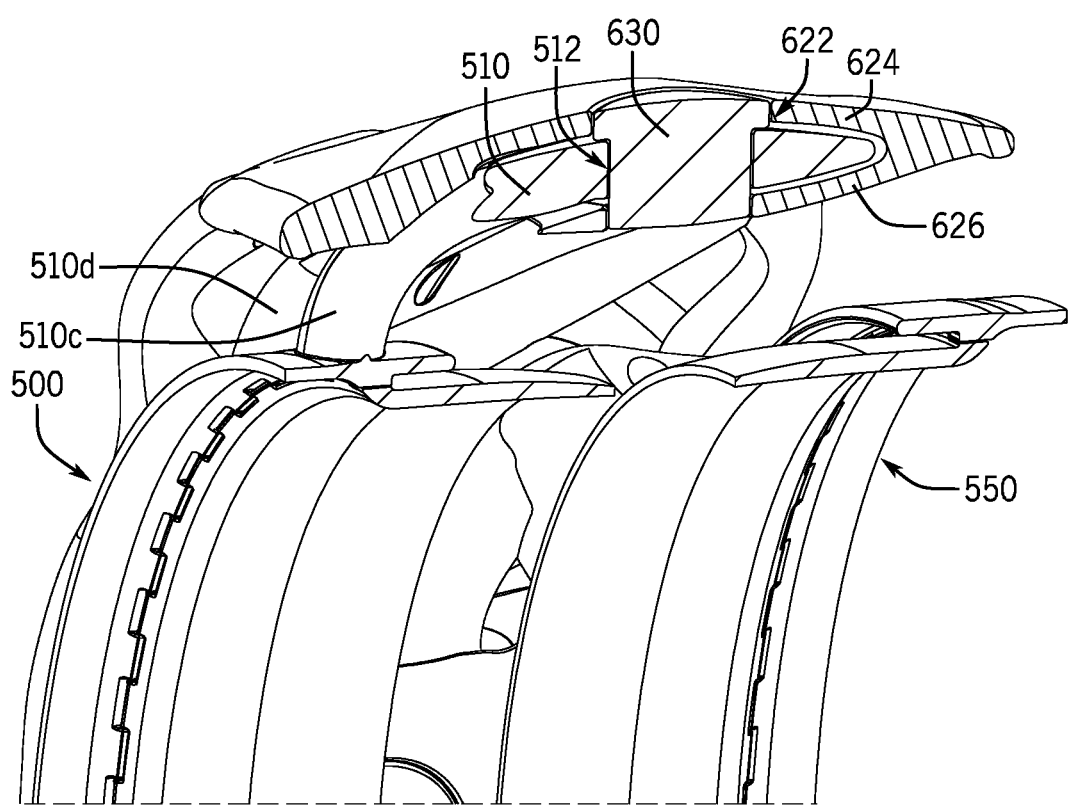
FIG. 14E is a cross-sectional perspective view of the example interlocking gimbal joint assembly, according to the embodiment of FIG. 11, taken along lines E-E and looking in the direction of the arrows.

The lower portion of the underhanging pocket structure of gimbal ring 600 also includes a bore hole that is aligned with bore hole 622 of gimbal ring 600 and bore hole 512 of first clevis 500 (see FIGS. 14C-E). In this arrangement, a pin (such as pin 630 or 640) extends through three bore holes, forming a "double shear" relationship that may resist shear forces more effectively compared to "single shear" gimbal joint designs, such as the gimbal joint design shown and described with respect to FIGS. 1A-7B.

Figure 12:
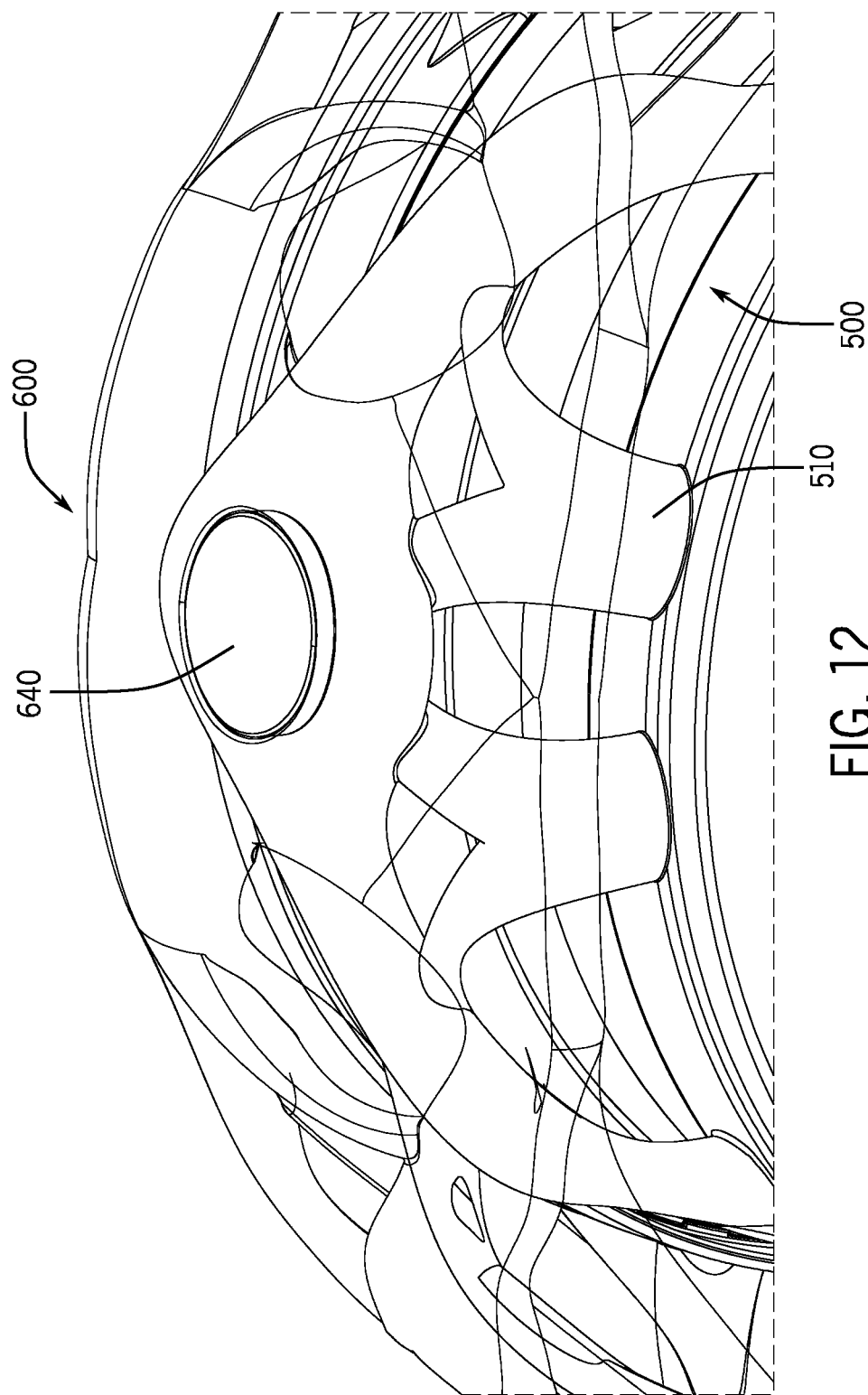
FIG. 12 is an enlarged front perspective phantom view of the example interlocking gimbal joint assembly, with a substantially transparent gimbal ring shown for explanatory purposes, according to the embodiment of FIG. 11.

FIG. 12 is a detailed perspective view showing an alternative pin 640 extending through bore holes of gimbal ring 600 and lobe 510. As with FIG. 11, gimbal ring 600 is shown as translucent for explanatory purposes only. Unlike pin 630, pin 640 includes a head that protrudes from and extends beyond the outer surface of gimbal ring 600.

Figure 13:
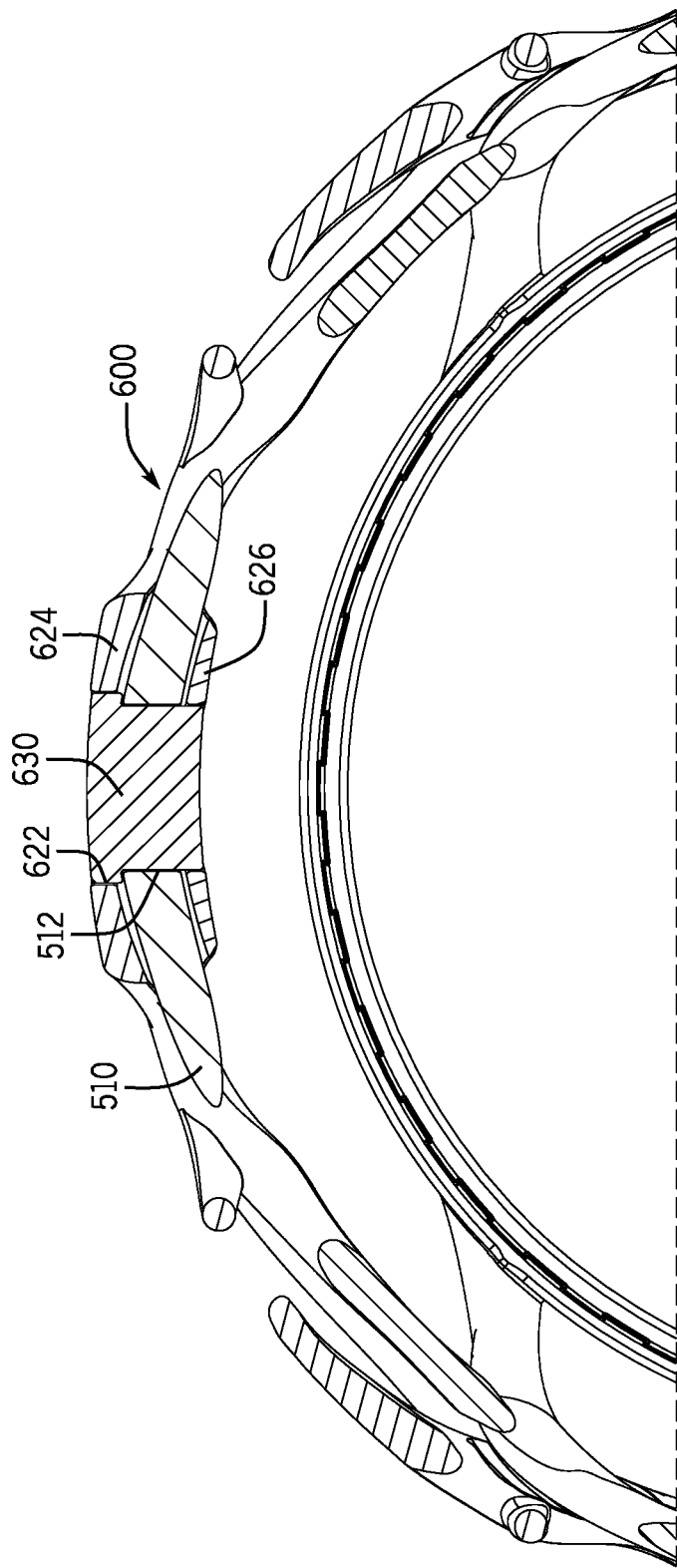
FIG. 13 is an elevated cross-sectional front view of the example interlocking gimbal joint assembly, according to the embodiment of FIG. 11, taken along lines 13-13 and looking in the direction of the arrows.

FIG. 13 is an elevated cross-sectional front view, taken along lines 13-13 in FIG. 11, showing lobe 510 positioned within the pocket formed between outer section 624 and inner section 626 of gimbal ring 600, and positioned about pin 630. As shown in FIG. 13, aligned bore holes extend through outer section 624 of gimbal ring 600, through lobe 510, and through bottom section 626 of gimbal ring 600. With pin 630 extending between these three aligned bore holes, first clevis 500 and gimbal ring 600 are coupled to each other in a "double shear" fashion that provides an increased resistance to shear forces.

FIGS. 14A-14E depict cutaway perspective views of the interlocking gimbal joint assembly, taken along different planes as defined by the dashed lines shown in FIG. 11. Multiple, successive cutaway views are shown to illustrate the relationship between gimbal ring 600, clevises 500 and 550, and the manner in which they "interlock" in a double-shear relationship.

FIG. 14A is a cutaway perspective view, taken along lines A-A in FIG. 11, showing lobe 510 extending from the annular portion of clevis 500 and into a "pocket" or cavity between outer section 624 and inner section 626 of gimbal ring 600. Notably, a clearance exists between gimbal ring 600 and lobe 510, such that the two components do not directly abut. As shown in FIG. 14A, lobe 510 includes extending portions 510a, 510b, 510c, and 510d, which are integrally formed with and extend from the annular shroud portion of clevis 500.

FIG. 14B is a cutaway perspective view, taken along lines B-B in FIG. 11, showing lobe 510 positioned within pocket or cavity formed between outer section 624 and underhanging inner section 626 of gimbal ring 600. As shown in FIG. 14B, lobe 510 initially extends underneath gimbal ring 600, and a portion of lobe 510 extends through the pocket or cavity defined by outer section 624 and inner section 626.

FIG. 14C is a cutaway perspective view, taken along lines C-C in FIG. 11, showing lobe 510 positioned within the C-shaped pocket formed between outer section 624 and underhanging inner section 626 of gimbal ring 600. As shown in FIG. 14C, outer section 624 and inner section 626 are integrally formed as a part of gimbal ring 600. The space between outer section 624 and inner section 626 may be shaped to substantially reflect the shape of lobe 510, to enhance the shear force resistance provided in the double-shear arrangement.

FIG. 14D is a cutaway perspective view, taken along lines D-D in FIG. 11 (substantially adjacent to lines C-C and intersecting pin 630), which also shows lobe 510 positioned within the C-shaped pocket formed between outer section 624 and underhanging inner section 626 of gimbal ring 600. As shown in FIG. 14D, pin 630 extends through bore holes of outer section 624, lobe 510, and inner section 626. In this configuration, upper section 624 and inner section 626 act as outer and inner gimbal rings, respectively, providing structural integrity and a substantial resistance to shear forces.

FIG. 14E is a cutaway perspective view, taken along lines E-E in FIG. 11 (substantially bisecting pin 630), which shows extending portion 510c of lobe 510 extending from the annular shroud portion of clevis 500 and into the pocket or cavity formed between outer section 624 and inner section 626 of gimbal ring 600. Similar to FIG. 14D, FIG. 14E shows the double-shear relationship formed by pin 630 extending through aligned bore holes of outer section 624, lobe 510, and inner section 626.

Figure 10:
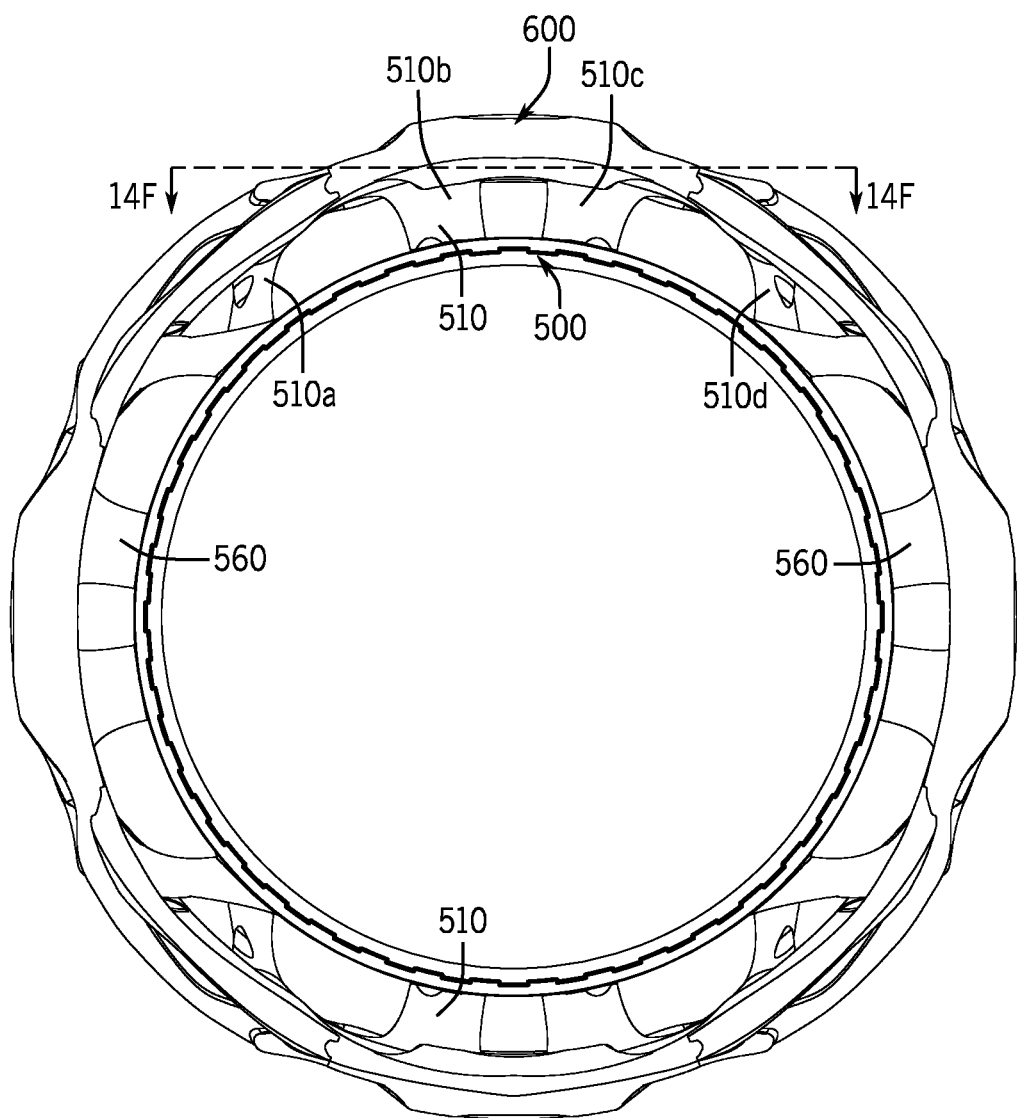
FIG. 10 is an elevated front view of the example interlocking gimbal joint assembly, according to the embodiment of FIG. 8.
Figure 14F:
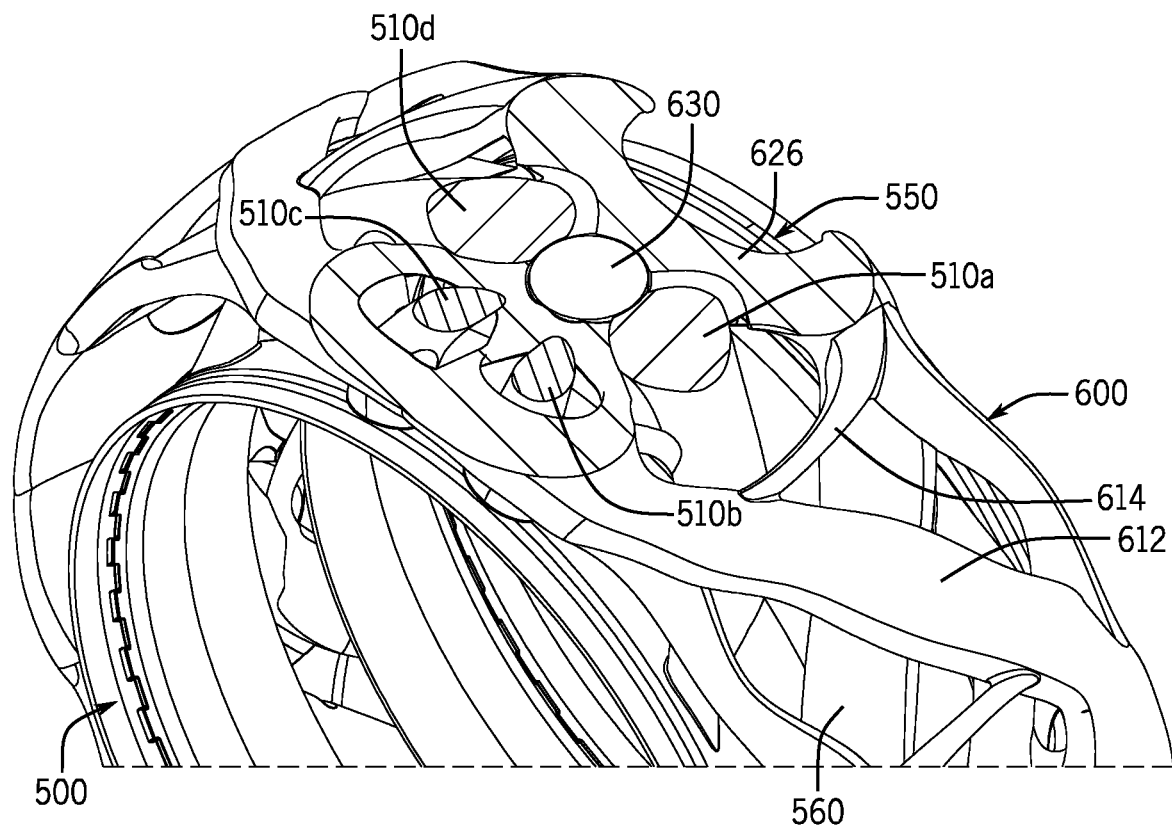
FIG. 14F is a cross-sectional perspective view of the example interlocking gimbal joint assembly, according to the embodiment of FIG. 10, taken along lines F-F and looking in the direction of the arrows.

FIG. 14F is a cutaway perspective view, taken along lines F-F in FIG. 10, which illustrates the manner in which each extending portion 510a, 510b, 510c, and 510e of lobe 510 passes through the pocket or cavity formed within gimbal ring 600. As shown in FIG. 14F, extending portions 510b and 510c project through substantially circular gaps formed within gimbal right 600, and extend toward (and eventually converge with) extending portions 510a and 510d, respectively. The interwoven and tightly compacted geometries of clevis 500, clevis 550, and gimbal ring 600 may be formed using additive manufacturing techniques.

As with the example embodiments shown and described above with respect to FIGS. 1A-7B, components of the interlocking gimbal joint assembly embodiment, such as clevises 500 and 550 and gimbal ring 600, may be geometrically and/or topologically optimized to balance the structural integrity of the gimbal joint assembly with the weight of the gimbal joint assembly. Some example optimization techniques are described in greater detail below.

As described above, aspects of the gimbal joint design may be parametrically generated and/or optimized according to a set of engineering requirements, design constraints, and other considerations. An example technique involves parameterizing aspects of a gimbal joint's design, such as the shape and size of the clevises, clevis lobes, and gimbal ring, the thickness of the material at various locations about the clevises and/or gimbal ring, and the dimensions of any struts, trusses, or shear web structures formed within the clevises and/or gimbal ring, among other aspects. The parameterized gimbal joint design may thereby serve as a model, which serves as a basis for computationally generating particular implementations of the parameterized model.

Generating a gimbal joint design may, in some embodiments, involve two stages of optimization. First, a set of design constraints and requirements (e.g., space constraints, the overall dimensions or size of the gimbal joint assembly, etc.) may be provided as parameters into a geometric optimizer. The geometric optimizer may perform a geometric optimization (e.g., shape and size optimizations) to determine a shape that satisfies the design constraints in view of one or more cost functions (e.g., component collisions or space between adjacent elements, total volume of material, the use of preferred shapes over other lesser-preferred shapes, etc.). The output of the geometric optimizer may provide a rough, space-constrained version of a gimbal joint design that may not be topologically optimized, and may exhibit features that are difficult to manufacture.

Geometric optimization techniques may also be used to augment or enhance engineering judgment. In developing an initial design of a component part, it remains commonplace for engineers to rely on their own judgment—which often involves some amount of trial-and-error and educated guesswork. Thus, it is often the case that an engineer or designer does not know with certainty whether or not a particular geometry would provide a suitable amount of structural compliance, maintain sufficient clearance with other adjacent components in an assembly, or otherwise be a feasible basis for a component's design. As a result, an engineer may waste a substantial amount of time and resources developing an initial design that is later determined to be unsuitable, impractical, or incompatible within an assembly.

By parameterizing aspects of a component's design and encoding them into a geometric optimizer or evaluator, according to the principles disclosed in the present application, an engineer may receive near real-time feedback on proposed component designs. Mathematically, a geometric optimizer might attempt to determine whether or not a solution exists to a system of equations (which define the constraints and boundaries for a given component), given one or more input parameter values. If the optimizer cannot find a solution for those input values that does not violate any boundaries, or otherwise unacceptably exceeds the constraints, then the optimizer might inform the engineer that no suitable designs exist for that input set of parameter values. Conversely, if the optimizer determines that one or more suitable solutions exist for the set of input values, then the optimizer may inform the engineer that the one or more suitable solutions exist. Such a geometric optimizer substantially reduces the amount of time involved in developing a component's initial design.

In addition, a geometric optimizer or evaluator may determine that one or more features or elements of a component are extraneous, dispensable, or otherwise can be omitted. For example, the geometric optimizer may determine that a clearance, material shape, void shape, and/or other elements can be removed, while still satisfying one or more structural requirements. In this manner, the geometric optimizer may further augment an engineer's design workflow, by indicating features of a given component's geometry that are unnecessary—expediting the design process, and avoiding the otherwise costly endeavor of constructing and testing component parts that are later discovered to be unsuitable.

In some cases, one or more constraints or limitations may be omitted from the geometric optimization process. For example, the components of an interlocking gimbal joint assembly, such as the embodiment shown and described with respect to FIGS. 8-14F, may be formed using additive manufacturing in a partially-assembled state. In such cases, determining whether two separate components can be assembled (e.g., whether sufficient clearance exists to permit one component to be arranged within, about, or otherwise together with) may be extraneous. Thus, for some assembly designs, topological optimization may precede geometric optimization.

Second, an additional set of constraints (e.g., features that cannot be manufactured, spaces beyond which a component cannot extend, etc.), boundary conditions (e.g., limitations of a particular manufacturing method, such as the resolution of an additive manufacturing machine or other support structures required for a particular additive manufacturing process), a particular range of loads or other engineering requirements (e.g., temperatures, pressures, shear stresses, compressive stresses, tensile stresses, bend angles, etc.), and other factors that may limit or affect the design and operation of the gimbal joint may be provided as parameters into a topological optimizer. The topological optimizer may serve to optimize the material layout and distribution within the constrained design space determined by the geometric optimizer.

The topological optimizer may, for example, attempt to determine a topology as a connected sum or two or more topological spaces or manifolds. For example, the lobes shown in the embodiments FIGS. 1A-7B include five smooth gaps or apertures in which dispensable material is omitted. Topologically, the lobe may be considered a connected sum of adjoining tori, with each torus corresponding to a gap in the lobe. More particularly, the lobe may be considered a "genus-five" surface comprised of five "glued" or attached tori. An example optimization technique may involve geometrically determining that a five tori shape satisfies a set of set of design requirements, and subsequently optimizing the shape of the lobe topologically in a way that reduces or minimizes the amount of remaining material, renders the design manufacturable in view of limitations on the manufacturing process or machine, and/or otherwise refining the shape of the lobe to increase the structural integrity of the shear web.

In this manner, the design of gimbal joint components may be generated, optimized, or otherwise refined. In some instances, designs for the components of the gimbal joint may be initially designed by an engineer (e.g., using computer aided design (CAD) software), which is subsequently refined or optimized geometrically and/or topologically. In other cases, an engineer may develop the parameterized model (e.g., as a system of parameterized equations that include objective functions, constraint functions, design spaces, a predetermined shape or set of shapes, etc.), which may serve as the basis for generating a design that is complaint with a particular set of requirements and engineering specifications. The particular parameters, shapes, topologies, and considerations in developing a parameterized model, a geometric optimizer, and/or a topological optimizer may vary, depending on the particular application for the gimbal joint (e.g., automotive systems, aircraft systems, aerospace systems, etc.).

Although certain example methods and apparatus have been described herein, the scope of coverage of this patent is not limited thereto. On the contrary, this patent covers all methods, apparatuses, and articles of manufacture fairly falling within the scope of the appended claims, either literally or under the doctrine of equivalents.

It should be understood that arrangements described herein are for purposes of example only. As such, those skilled in the art will appreciate that other arrangements and other elements (e.g. machines, interfaces, operations, orders, and groupings of operations, etc.) can be used instead, and that some elements may be omitted altogether, according to the desired results. Further, many of the elements that are described are functional entities that may be implemented as discrete or distributed components or in conjunction with other components, in any suitable combination and location, or as other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A sealed joint assembly for transmitting high temperature and high pressure fluid between adjoining ducts, the joint assembly comprising:
    a gimbal ring comprising at least one pair of overlapping struts extending circumferentially around a portion of the gimbal ring, said at least one pair of overlapping struts being integrally formed in the gimbal ring, and a set of bores circumferentially spaced about the gimbal ring;
    a first clevis comprising an annular shroud adapted for positioning concentrically within a portion of the gimbal ring, and at least two lobes integrally formed with the shroud, each lobe extending radially outward to overlay at least a portion of the gimbal ring, and each lobe having a bore extending therethrough for alignment with a first respective bore of the gimbal ring, said first clevis adapted to sealingly couple with a duct conveying high temperature and high pressure fluid;
    a second clevis comprising an annular shroud adapted for positioning concentrically within a portion of the gimbal ring, and at least two lobes integrally formed with the shroud, each lobe extending radially outward to overlay at least a portion of the gimbal ring, and each lobe having a bore extending therethrough for alignment with a second respective bore of the gimbal ring, said second clevis adapted to sealingly couple with a duct conveying high temperature and high pressure fluid; and
    a bellows having a first end and a second end, said first end being sealingly coupled to the first clevis, and said second end being sealingly coupled to the second clevis.

2. The joint assembly according to claim 1, in which at least one lobe of said first clevis comprises one or more apertures that form a shear web.

3. The joint assembly according to claim 1, in which the bellows further includes a plurality of convolutions positioned between said first and second ends.

4. The joint assembly according to claim 1, in which the gimbal ring has a first end and a second end axially opposite to the first end, said gimbal ring further including a first region and a second region between which said pair of overlapping struts circumferentially extends, said pair of overlapping struts including a first strut and a second strut, wherein the first strut extends from a second side of the first region to a first side of the second region, wherein the second strut extends from a first side of the second region to a second side of the first region, and wherein the first and second struts are not connected at the location where the first and second struts overlap.

5. The joint assembly according to claim 4, in which the first strut is integrally formed with the first region and the second region, and wherein the second strut is integrally formed with the first region and the second region.

6. The joint assembly according to claim 1, further comprising a first pair of at least two pins, each pin extending through a bore of the gimbal ring and a respective bore of the first clevis, and a second pair of at least two pins, each pin extending through a bore of the gimbal ring and a respective bore of the second clevis.

7. The joint assembly according to claim 1, in which said gimbal ring is constructed using additive manufacturing.

8. The joint assembly according to claim 1, in which the first clevis is constructed using additive manufacturing.

9. The joint assembly according to claim 1, in which the first clevis has an optimized geometry that is computationally generated based on one or more dimensional constraints.

10. The joint assembly according to claim 1, in which the gimbal ring has an optimized geometry that is computationally generated based on one or more dimensional constraints.

11. The joint assembly according to claim 1, in which the first clevis has an optimized topology that is computationally generated based on one or more load specifications.

12. The joint assembly according to claim 1, in which the gimbal ring has an optimized topology that is computationally generated based on one or more load specifications.

13. The joint assembly according to claim 1, in which said annular shroud of the first clevis includes a distal section and a proximal section integrally formed with the distal section, wherein a portion of said distal section concentrically overlaps a portion of said proximal section to form an axially-extending slot, said axially-extending slot of the first clevis being adapted to receive the first end of the bellows.

14. A sealed joint assembly for transmitting high temperature and high pressure fluid between adjoining ducts, the joint assembly comprising:
    a gimbal ring comprising at least one pair of overlapping struts extending circumferentially around a portion of the gimbal ring and a set of bores circumferentially spaced about the gimbal ring;
    a first clevis comprising an annular shroud adapted for positioning concentrically within a portion of the gimbal ring, and at least two lobes integrally formed with the shroud, each lobe extending radially outward and axially over a portion of the gimbal ring, and each lobe having a bore extending therethrough for alignment with a first respective bore of the gimbal ring, said first clevis adapted to sealingly couple with a duct conveying high temperature and high pressure fluid;
    a second clevis comprising an annular shroud adapted for positioning concentrically within a portion of the gimbal ring, and at least two lobes integrally formed with the shroud, each lobe extending radially outward and axially over a portion of the gimbal ring, and each lobe having a bore extending therethrough for alignment with a second respective bore of the gimbal ring, said second clevis adapted to sealingly couple with a duct conveying high temperature and high pressure fluid; and a bellows having a first end and a second end, said first end being sealingly coupled to the first clevis, and said second end being sealingly coupled to the second clevis, wherein said annular shroud of the first clevis comprises a distal section and a proximal section integrally formed with the distal section, wherein a portion of said distal section concentrically overlaps a portion of said proximal section to form an axially-extending slot, said axially-extending slot of the first clevis being adapted to receive the first end of the bellows, and wherein said annular shroud of the first clevis further comprises a plurality of apertures extending axially between an inner surface of the annular shroud and the axially-extending slot, said apertures adapted to convey braze flux to the first end of said bellows that, after brazing, causes the bellows to form a fluid-tight seal with said first clevis.

15. A method of manufacturing a sealed gimbal joint for transmitting high temperature and high pressure fluid between adjoining ducts, the method comprising:

forming, by additive manufacturing, a gimbal ring that includes at least one pair of overlapping struts extending circumferentially around a portion of the gimbal ring, said gimbal ring having a set of bores circumferentially spaced about the gimbal ring;

forming, by additive manufacturing, a first clevis that includes an annular shroud adapted for positioning concentrically within a portion of the gimbal ring, and at least two lobes integrally formed with the shroud, each lobe extending radially outward to overlay at least a portion of the gimbal ring, and each lobe having a bore extending therethrough for alignment with a respective bore of the gimbal ring;

forming, by additive manufacturing, a second clevis that includes an annular shroud adapted for positioning concentrically within a portion of the gimbal ring, and at least two lobes integrally formed with the shroud, each lobe extending radially outward to overlay at least a portion of the gimbal ring, and each lobe having a bore extending therethrough for alignment with a respective bore of the gimbal ring; and sealingly coupling a first end of a bellows to said first clevis and a second end of the bellows to said second clevis.

16. The method according to claim 15, further comprising:

aligning the bores of the at least two lobes of the first clevis with a first pair of bores of the set of bores of the gimbal ring;

aligning the bores of the at least two lobes of the second clevis with a second pair of bores of the set of bores of the gimbal ring; and inserting a set of pins through each respective aligned pair of bore holes, to rigidly couple the first and second devises to the gimbal ring.

17. A method of manufacturing a sealed gimbal joint for transmitting high temperature and high pressure fluid between adjoining ducts, the method comprising:

forming, by additive manufacturing, a gimbal ring that includes at least one pair of overlapping struts extending circumferentially around a portion of the gimbal ring, said gimbal ring having a set of bores circumferentially spaced about the gimbal ring;

forming, by additive manufacturing, a first clevis that includes an annular shroud adapted for positioning concentrically within a portion of the gimbal ring, and at least two lobes integrally formed with the shroud, each lobe extending radially outward and axially over a portion of the gimbal ring, and each lobe having a bore extending therethrough for alignment with a respective bore of the gimbal ring;

forming, by additive manufacturing, a second clevis that includes an annular shroud adapted for positioning concentrically within a portion of the gimbal ring, and at least two lobes integrally formed with the shroud, each lobe extending radially outward and axially over a portion of the gimbal ring, and each lobe having a bore extending therethrough for alignment with a respective bore of the gimbal ring;

sealingly coupling a first end of a bellows to said first clevis and a second end of the bellows to said second clevis;

forming, in the annular shroud of the first clevis, a plurality of circumferentially-spaced apertures that each extend axially between an inner surface of the annular shroud and the axially-extending slot;

providing braze flux through one or more of the plurality of circumferentially-spaced apertures and proximate to the first end of said bellows; and brazing the first end of said bellows to the first clevis.

18. A sealed joint assembly for transmitting high temperature and high pressure fluid between adjoining ducts, the joint assembly comprising:

a gimbal ring having at least one pair of overlapping struts integrally formed therein;

a first clevis comprising an annular shroud adapted for positioning concentrically within a portion of the gimbal ring, and at least two lobes integrally formed with the shroud, each lobe extending radially outward to overlay at least a portion of the gimbal ring, and wherein each lobe includes one or more gaps to produce a shear web of interconnected trusses extending across the lobe;

a second clevis comprising an annular shroud adapted for positioning concentrically within a portion of the gimbal ring, and at least two lobes integrally formed with the shroud, each lobe extending radially outward to overlay at least a portion of the gimbal ring, and wherein each lobe includes one or more gaps to produce a shear web of interconnected trusses extending across the lobe; and a bellows having a first end and a second end, said first end being sealingly coupled to the first clevis, and said second end being sealingly coupled to the second clevis.

* * * * *